(12) United States Patent
Arora et al.

(10) Patent No.: US 12,024,170 B2
(45) Date of Patent: Jul. 2, 2024

(54) LANE CHANGE GAP FINDER

(71) Applicant: Zoox, Inc., Foster City, CA (US)

(72) Inventors: Akash Arora, San Mateo, CA (US); Lichao Ma, Santa Clara, CA (US)

(73) Assignee: Zoox, Inc., Foster City, CA (US)

( * ) Notice: Subject to any disclaimer, the term of this patent is extended or adjusted under 35 U.S.C. 154(b) by 170 days.

(21) Appl. No.: 17/121,086

(22) Filed: Dec. 14, 2020

(65) Prior Publication Data

US 2022/0185289 A1    Jun. 16, 2022

(51) Int. Cl.
*B60W 30/18*    (2012.01)
*B60W 30/09*    (2012.01)
*B60W 30/095*    (2012.01)
*B60W 30/16*    (2020.01)
*B60W 50/00*    (2006.01)
*B60W 60/00*    (2020.01)
(Continued)

(52) U.S. Cl.
CPC .. *B60W 30/18163* (2013.01); *B60W 30/0956* (2013.01); *B60W 30/162* (2013.01); *B60W 50/0097* (2013.01); *B60W 60/0011* (2020.02); *B60W 60/0027* (2020.02); *G01C 21/3453* (2013.01); *G08G 1/167* (2013.01); *B60W 30/09* (2013.01); *B60W 2554/80* (2020.02); *B60W 2555/60* (2020.02)

(58) Field of Classification Search
CPC ....... B60W 30/18163; B60W 60/0027; B60W 60/0011; B60W 30/0956; B60W 30/162; B60W 50/0097; B60W 2555/60; B60W 2554/80; B60W 30/09; G01C 21/3453; G08G 1/167
See application file for complete search history.

(56) References Cited

U.S. PATENT DOCUMENTS 9,612,123 B1   4/2017  Levinson et al.
10,353,390 B2  7/2019  Linscott et al.
(Continued)

FOREIGN PATENT DOCUMENTS

CN    110775063 A    2/2020
KR   20190091366 A    8/2019

OTHER PUBLICATIONS

The International Search Report and Written Opinion for PCT Application No. PCT/US21/62844, mailed Apr. 14, 2022, 10 pages.

*Primary Examiner* — Fadey S. Jabr
*Assistant Examiner* — Naeem Taslim Alam
(74) *Attorney, Agent, or Firm* — Lee & Hayes, P.C.

(57) ABSTRACT

Techniques for determining gaps for performing lane change operations are described. A first region in an environment of a vehicle can be determined. The first region can be associated with a first time period through which the vehicle is unable to travel and can correspond to a constraint space. A second region of the environment can be determined. The second region can be associated with a second time period and can correspond to a configuration space. A gap in the environment can be determined based on a portion of the configuration space that is exclusive of the constraint space. A trajectory can be determined based on the gap. The trajectory can be associated with performing a lane change operation and can be associated with a cost. The vehicle can be controlled to perform the lane change operation based at least in part on the trajectory and the cost.

20 Claims, 8 Drawing Sheets

(51) Int. Cl.
    *G01C 21/34*     (2006.01)
    *G08G 1/16*     (2006.01)

(56) References Cited

U.S. PATENT DOCUMENTS

| | | | |
|---|---|---|---|
| 2018/0157038 A1* | 6/2018 | Kabe | G02B 27/0101 |
| 2019/0315360 A1* | 10/2019 | Kim | B60W 50/0098 |
| 2020/0142417 A1 | 5/2020 | Hudecek | |
| 2020/0180633 A1* | 6/2020 | Wu | B60W 30/18163 |
| 2020/0301428 A1* | 9/2020 | Tosaki | G05D 1/0212 |
| 2020/0307579 A1* | 10/2020 | Mizoguchi | B62D 15/0255 |
| 2020/0307589 A1* | 10/2020 | Li | B60W 60/0023 |
| 2021/0001873 A1* | 1/2021 | Ingrody | B60W 50/14 |
| 2021/0061282 A1* | 3/2021 | Jafari Tafti | B60W 30/18163 |
| 2021/0117698 A1* | 4/2021 | Horinaga | H04N 7/18 |
| 2021/0148727 A1* | 5/2021 | Narayanan | G06V 20/58 |
| 2021/0362720 A1* | 11/2021 | Takahashi | B62D 6/003 |
| 2021/0389153 A1* | 12/2021 | Zhen | B60W 30/12 |
| 2021/0402999 A1* | 12/2021 | Park | B60W 50/0098 |
| 2022/0084332 A1* | 3/2022 | Arechiga Gonzalez | G07C 5/00 |

\* cited by examiner

LANE CHANGE GAP FINDER

BACKGROUND

A vehicle driving in an environment can perform a lane change operation, for example, to merge into another lane, to maneuver around a vehicle in its lane, and/or the like. To perform such an operation, the vehicle can evaluate a cost of staying in a current lane and moving behind a vehicle in a target lane. Existing techniques, however, are limited in what contextual data can be considered in decision making associated with performing such an operation and are inefficient.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
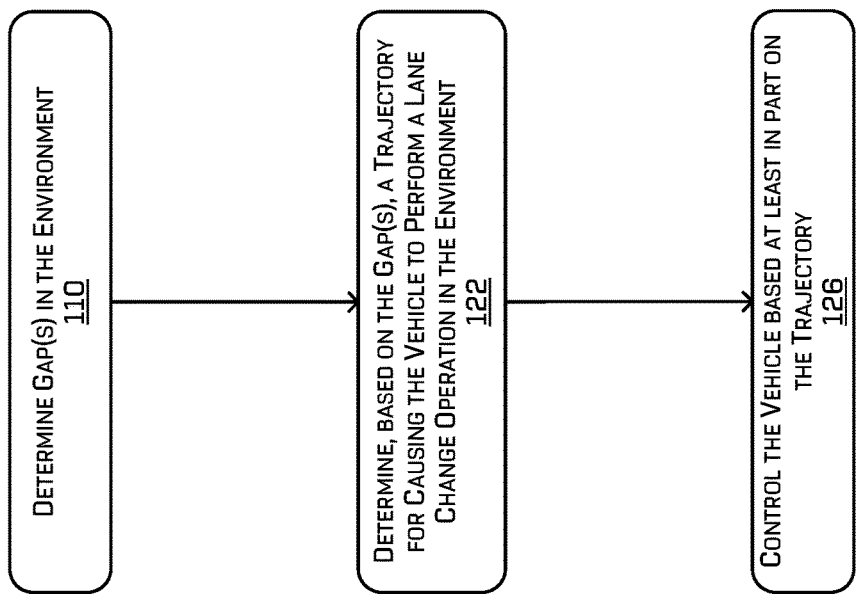
FIG. 1 illustrates an example environment for determining a trajectory for controlling a vehicle to perform a lane change operation, as described herein.
Figure 1:
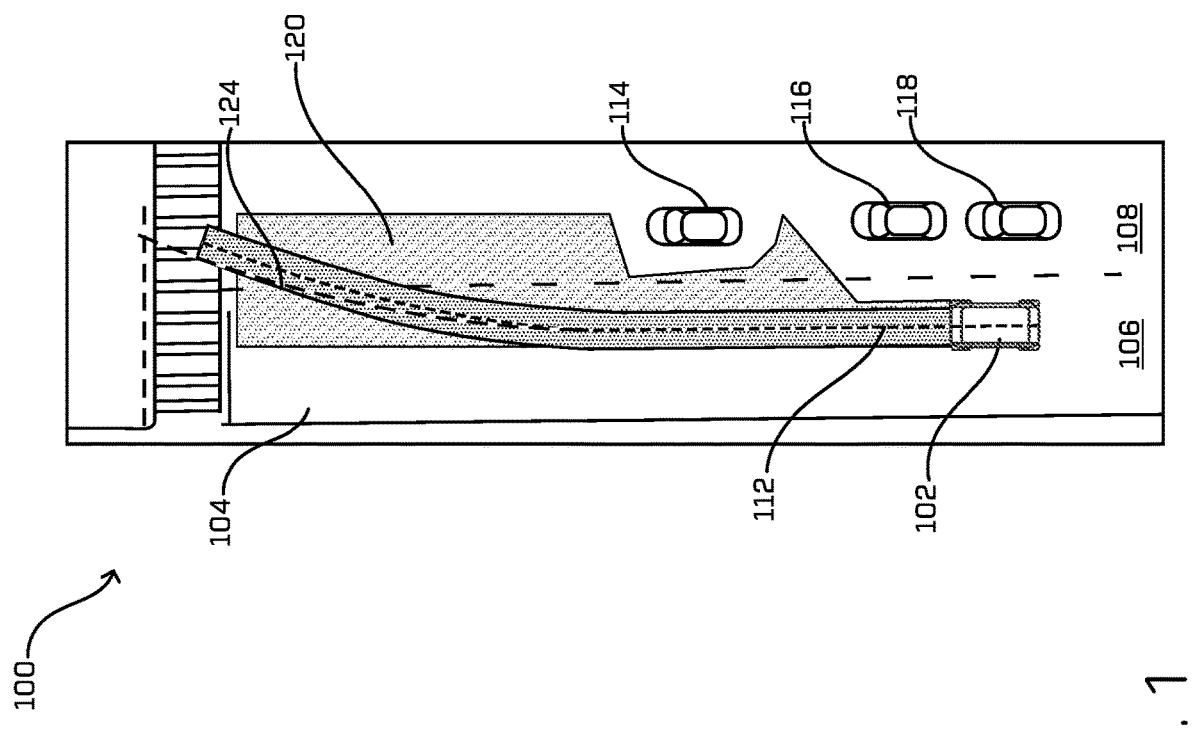

Techniques for determining gap(s) in an environment to enable a vehicle to perform a lane change operation are described herein. Techniques described herein relate to identifying constraint(s) in an environment of a vehicle (e.g., objects, rules of the road, safety margins, etc.) and determining gap(s) in which the vehicle can move, to perform a lane change operation, without violating the identified constraints. That is, techniques described herein are directed to removing, from consideration in route planning, spaces associated with objects and/or associated with other constraints to determine remaining space(s) the environment. Such remaining space(s) can be "gap(s)" that can be used for determining a trajectory associated with performing a lane change operation. A trajectory associated with performing the lane change operation can be validated based at least in part on determining whether the trajectory is associated with gap(s) during the lane change operation. In some examples, a validated trajectory can be determined for controlling the vehicle based at least in part on determining a trajectory based on constraints (e.g., determining that the trajectory is associated with gap(s) during the lane change operation) that, in some examples, has a lowest cost associated therewith. The trajectory determined to perform the lane change operation can be used for controlling the vehicle to perform the lane change operation.

A lane change operation can be achieved by a sequence of in-lane longitudinal actions (e.g., in a current lane) to align the vehicle to a gap in a target lane and then a lateral action to merge into the gap. For the purpose of this discussion, a "gap" can be a continuous multi-dimensional space where the vehicle can move from a current lane to a target lane with no or minimal interaction with object(s) in the environment (e.g., without collision, without causing the object(s) to brake at a rate above a threshold (e.g., decelerate uncomfortably), and/or the like) and/or without otherwise violating constraint(s) associated with the environment.

In at least one example, gap(s) can be determined by solving a constraints satisfaction problem. That is, a gap finding problem can be modeled as a constraints satisfaction problem to find gap(s) that a vehicle can move into (e.g., in a target lane) with no or minimal interaction with object(s) in its environment and/or without otherwise violating constraint(s) associated with the environment. In some examples, constraints can be determined based on sensor data associated with the environment and/or map data associated with the environment. In at least one example, such constraints can be associated with objects in the environment and/or other constraints (e.g., vehicle dynamics, safety distance, distance range to start a lane change operation, time range to start a lane change operation, acceleration range, velocity range, lane change time, blinker time, junction space, lane ending, speed limit, etc.) that can affect a lane change operation. In at least one example, an object and/or another constraint associated with the environment can each be associated with distance-time constraint that it imposes in the environment. Further, an object and/or another constraint associated with the environment can be associated with a vehicle dynamic constraint, based at least in part on velocity and/or acceleration. Such constraints can be modeled (e.g., projected) in a coordinate space representative of the environment. That is, individual constraints can be associated with representations in a coordinate space associated with an environment and gap(s) can be determined by finding space (e.g., multi-dimensional) within which the vehicle can move that does not violate the constraints. In various examples, such a coordinate space may be partitioned, or otherwise reduced, to define such gap(s) in a single dimension (e.g., a route-relative longitudinal coordinate) relative to time and/or for particular lanes or regions of an environment proximate the vehicle.

In at least one example, gap(s) can be used to reduce a search space (e.g., multi-dimensional) in which a planner component associated with the vehicle can search to determine trajectories for controlling the vehicle to perform the lane change operation. That is, in at least one example, a trajectory can be validated in view of the gap(s) determined for the environment and, based at least in part on determining that a trajectory is associated with individual of the gap(s), the trajectory can be used for controlling the vehicle to perform the lane change operation. In some examples, the trajectory can be associated with a cost, as described below, which can be used to determine whether to use the trajectory for controlling the vehicle to perform the lane change operation. Such costs may be used to ensure that the vehicle is making progress, maintaining safe distances to other objects, performing the lane change operation as soon as possible, and/or the like.

Techniques described herein offer increased efficiency in route planning of vehicles, such as autonomous vehicles, especially in areas of dense traffic. That is, by modeling the environment of the vehicle and identifying gap(s) as described herein, the search space searched by the planner component can be greatly reduced. Such a reduction can enable the search to be performed faster and with more accuracy. That is, gap(s) can be constraint(s) that can limit the scope of the search to enable the planner component to find a solution quicker than in conventional and/or existing techniques. As such, the planner component can generate and/or validate trajectories faster and more efficiently than with conventional and/or existing techniques.

Furthermore, by modeling the environment of the vehicle and identifying gap(s) as described herein, techniques described herein enable improved lane change behavior. Techniques described herein enable consideration of all constraint(s) in an environment, which offers more context for improved decision making with respect to route planning and execution. For example, existing techniques can determine costs associated with staying in a current lane and getting behind a vehicle in a target lane but can exclude other constraints in the environment. Such costs can be hard to tune and may not guarantee a valid solution. Furthermore, in existing techniques, such costs can be associated with a pairwise feature and can lack context to make an informed decision. In some examples, a most conservative route can be determined, which may not be an optimal solution. By utilizing gap(s), as described herein, environmental context can be taken into account when determining trajectories for controlling the vehicle. As such, trajectories output by planner component(s) can be more accurate, feasible, and comfortable (e.g., for a passenger of a vehicle) than trajectories output via conventional or existing techniques.

While techniques described herein are described in the context of performing a lane change operation, techniques described herein can be similarly useful for performing merge operations, parking operations (e.g., pulling into a parking spot, pulling out of a parking spot), and/or the like.

FIG. 1 illustrates an example environment 100 (e.g., a top-down view thereof) for determining a trajectory for controlling a vehicle 102 to perform a lane change operation, as described herein. In at least one example, the vehicle 102 can be traversing the environment 100. In at least one example, the vehicle 102 can be positioned on a drivable surface 104 (e.g., a road) that can have multiple lanes. Two lanes are illustrated in FIG. 1: a first lane 106, which can be referred to as a "current lane" as the vehicle 102 is currently positioned in the first lane 106, and a second lane 108, which can be referred to as a "target lane" as the vehicle 102 can be associated with an intent to perform a lane change operation by moving from the first lane 106 into the second lane 108. As described above, a lane change can be achieved by a sequence of in-lane longitudinal actions (e.g., in the first lane 106) to align the vehicle 102 to a gap in the second lane 108 and then a lateral action to merge into the gap.

As described above, a "gap" can be a continuous multi-dimensional space where the vehicle 102 can move (e.g., it is physically feasible for the vehicle 102 to move) from the first lane 106 to the second lane 108 with no or minimal interaction with object(s) in the environment 100 (e.g., without collision, without causing the object(s) to brake at a rate above a threshold (e.g., decelerate uncomfortably), and/or the like) and/or without otherwise violating a constraint associated with the environment 100. In at least one example, the multi-dimensional space can comprise a time dimension (t), a longitudinal distance dimension (s) indicative of a distance along a route, and/or a lateral distance dimension (ey) indicative of a lateral distance from the route. In at least one example, the distance dimensions (e.g., longitudinal distance dimension (s) and/or a lateral distance dimension (ey)) can be "route frame relative." That is, the distance dimensions can be measured relative to a route frame of the vehicle 102. For example, the distance dimension (s) can represent a distance of a vehicle or an object along (or projected along) a trajectory (e.g., a current trajectory 112) of the vehicle 102. That is, the route frame can be determined based on the current trajectory 112 of the vehicle 102.

At operation 110, a gap finder component associated with vehicle computing device(s) of the vehicle 102, can determine gap(s) in the environment 100. In at least one example, gap(s) can be determined by solving a constraints satisfaction problem. That is, a gap finding problem can be modeled as a constraints satisfaction problem to find gap(s) that the vehicle 102 can move into (e.g., in a target lane) with no or minimal interaction with object(s) in the environment 100 and/or otherwise violating a constraint associated with the environment 100. In at least one example, a gap can comprise a portion of a configuration space associated with the vehicle 102 that is exclusive of space(s) associated with constraint(s) (e.g., "constraint space(s)"). A constraint space can be associated with a region of the environment 100 through which the vehicle 102 is unable to travel for some period of time.

In some examples, constraints can be determined based on sensor data associated with the environment 100 and/or map data associated with the environment 100. In at least one example, such constraints can be associated with objects in the environment 100, such as the vehicles 114-118, and/or other constraints (e.g., vehicle dynamics, safety distance, distance range to start a lane change operation, time range to start a lane change operation, acceleration range, velocity range, lane change time, blinker time, junction space, lane ending, speed limit, etc.) that can affect a lane change operation. In at least one example, an object and/or another constraint associated with the environment 100 can each be associated with distance-time constraint that it imposes in the environment 100. Further, an object and/or another constraint associated with the environment 100 can be associated with a vehicle dynamic constraint, based at least in part on velocity and/or acceleration. In at least one example, a space associated with a constraint can be referred to as a "constraint space." In at least one example, constraint(s) can be modeled (e.g., projected) in a coordinate space representative of the environment 100 and a gap can be determined by finding a space within which the vehicle 102 can move (e.g., is capable of moving) that does not violate the constraint(s). An example of a gap 120 with respect to the second lane 108 is illustrated in FIG. 1. Additional details are provided below with reference to FIGS. 2A, 2B, and 3.

While a single gap 120 is illustrated in FIG. 1, in some examples, a plurality of gaps can be determined, and each gap can be associated with a cost indicating a quality of the gap. A cost associated with a gap can be based at least in part on an area or space associated with the gap. That is, a gap associated with a smaller area and/or space can be associated with a higher cost and a gap associated with a larger area and/or space can be associated with a smaller cost. Additional details are provided below.

At operation 122, a planner component associated with the vehicle computing device(s) of the vehicle 102 can determine, based on the gap(s), a trajectory 124 for causing the vehicle 102 to perform a lane change operation in the environment 100. In at least one example, the planner component can compare a trajectory 124 with gap(s) determined as described above. In some examples, the planner component can compare a trajectory 124 with gap(s) determined in different phases of a lane change operation. In at least one example, such phases can include, but are not limited to, a preparation phase, a merge phase, and a target phase. The preparation phase can correspond to a period of time during which the vehicle 102 can move longitudinally within the first lane 106 to align itself with a gap in the second lane 108 with no or minimal interaction with object(s) (e.g., the vehicle(s) 114-118) in the second lane 108. The merge phase can correspond to a period of time when the vehicle 102 is aligned with the gap in the second lane 108 and preparing to execute a lateral motion to merge into the gap with no or minimal interaction with object(s) in the first lane 106 and/or the second lane 108. The target phase can correspond to a period of time after the vehicle 102 has merged into the second lane 108 and is adjusting its velocity for avoiding interaction with object(s) in the second lane 108. As described below, each phase can be associated with a lateral distance (ey) range. In any one or more of the examples described herein, the one or more gaps may be determined relative to a particular lane. As a non-limiting example, gap(s) associated with the preparation phase may be determined with respect to lane 106, gap(s) associated with the target phase may be determined relative to the second lane 108, and/or gap(s) associated with merge phase may be determined based at least in part on both lanes 106 and 108. Examples are provided below.

In at least one example, based at least in part on determining that the trajectory 124 is associated with a gap in each phase described above, the planner component can validate the gap (e.g., indicating that the gap is feasible) and determine that the trajectory 124 can be used to cause the vehicle 102 to perform the lane change operation in the environment 100. In some examples, determining whether the trajectory 124 is associated with a gap in each phase can be modeled as a search. In such examples, the planner component can perform a search to determine whether a particular trajectory (e.g., the trajectory 124) is associated with a gap in each phase of a lane change operation. Such a search can be associated with a determination of whether a trajectory is the best option for performing the lane change operation.

In at least one example, a cost can be determined for the trajectory 124. A cost can be determined based at least in part on a length of the trajectory 124 in each of the phases (e.g., penalizes a shorter trajectory length), an amount of time associated with performing the lane change operation (e.g., penalizes a larger amount of time associated with performing the lane change operation), an amount of time in the first lane 106 (e.g., penalizes a slow start to a lane change operation), a distance travelled during the lane change operation (e.g., penalizes a shorter distance), a relative distance between the vehicle 200 and other object(s) and/or constraint(s) (e.g., penalizes a small distance between the vehicle 200 and other object(s) and/or constraint(s), lack of forward progress, etc.), etc. In some examples, a sub-cost can be determined for the trajectory 124 for each phase described above and the cost can be determined by each of the sub-costs. In some examples, the planner component can determine whether the cost associated with the trajectory 124 is below a threshold prior to determining the trajectory 124, as described above at operation 122, and/or using the trajectory 124 to control the vehicle 102, as described above at operation 126.

In some examples, multiple potential trajectories can be generated for performing the lane change operation. In such examples, individual of the potential trajectories can be compared to the gap(s) output from the gap finder component as described above to validate individual of the potential trajectories and/or to determine a cost associated with the corresponding potential trajectory. That is, the planner component can perform a search of potential trajectories relative to the gap(s) to find a best potential trajectory (e.g., a potential trajectory that minimizes the cost of performing the lane change operation). In such examples, the planner component can determine the trajectory 124 based at least in part on a potential trajectory associated with a lowest cost. That is, planner component can determine the trajectory 124 based at least in part on comparing the potential trajectories to the gap(s) and selecting a potential trajectory that minimizes cost associated with the lane change operation.

In at least one example, the trajectory 124 can be used to control the vehicle 102, as illustrated at operation 126. That is, the planner component can utilize the trajectory 124 to generate commands (e.g., steering and/or acceleration) for causing the vehicle 102 to travel along the trajectory 124.

Figure 2A:
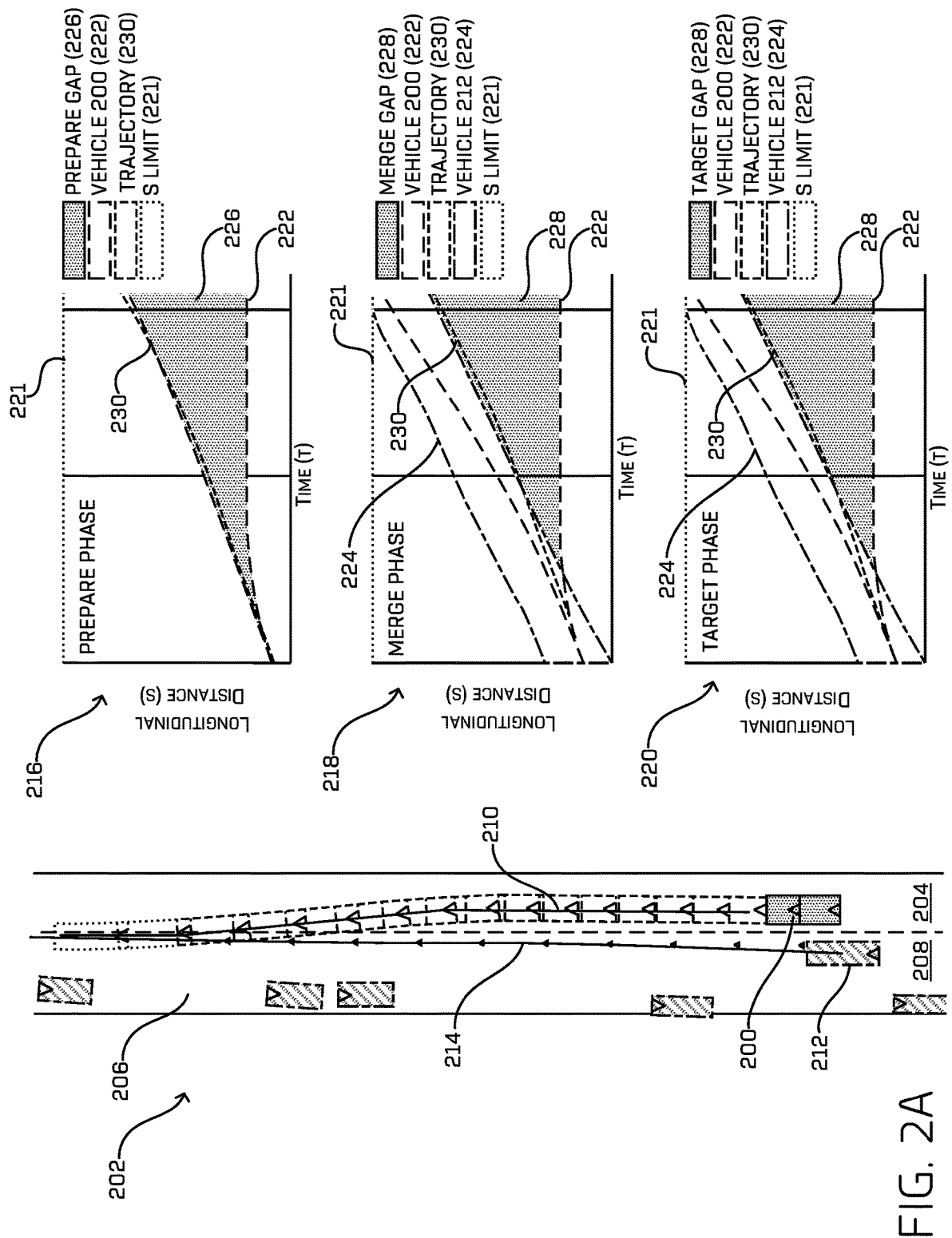
FIG. 2A illustrates an example of determining a trajectory for controlling a vehicle to perform a lane change operation, as described herein.
Figure 2B:
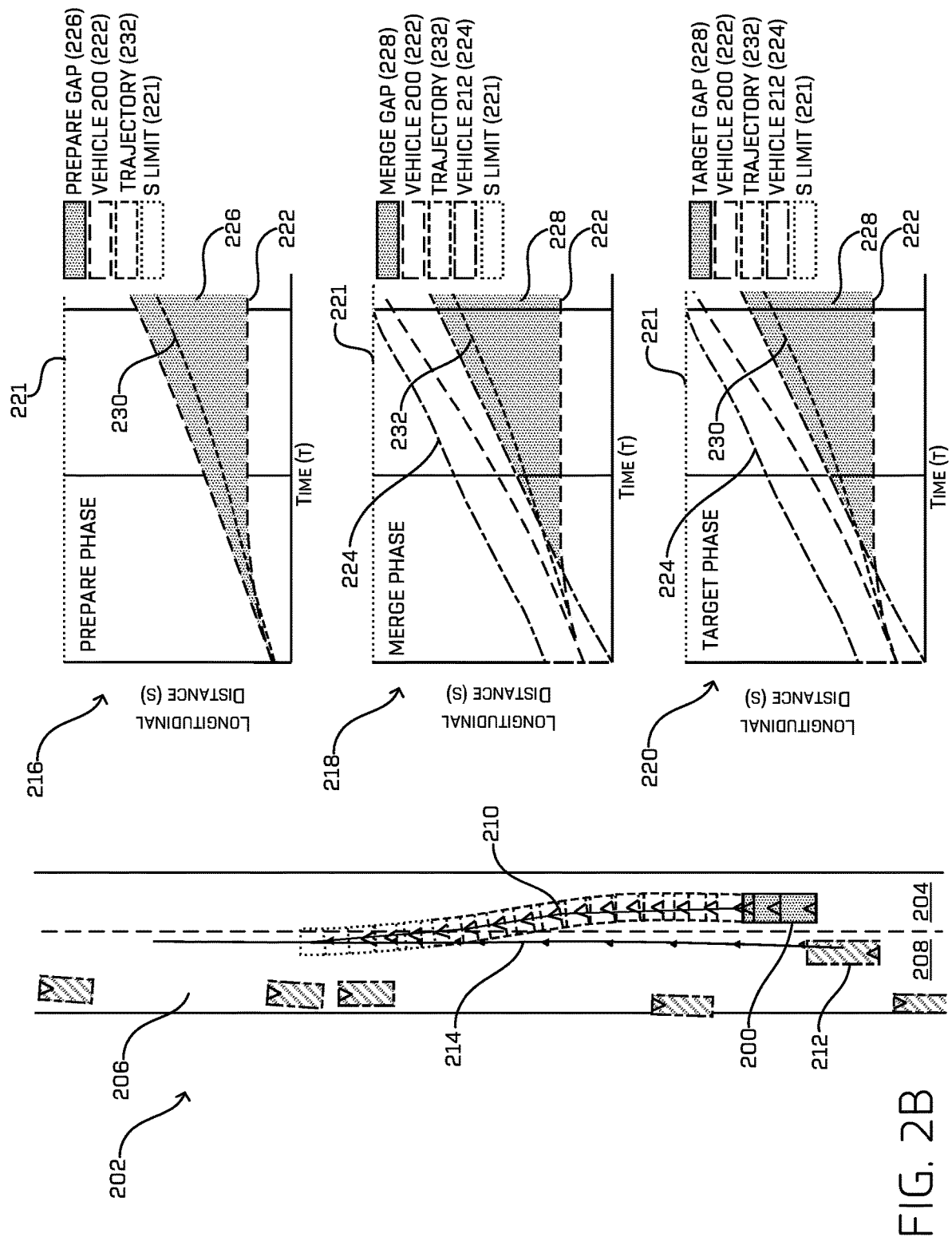
FIG. 2B illustrates an example of determining a trajectory for controlling a vehicle to perform a lane change operation, as described herein.
Figure 2C:
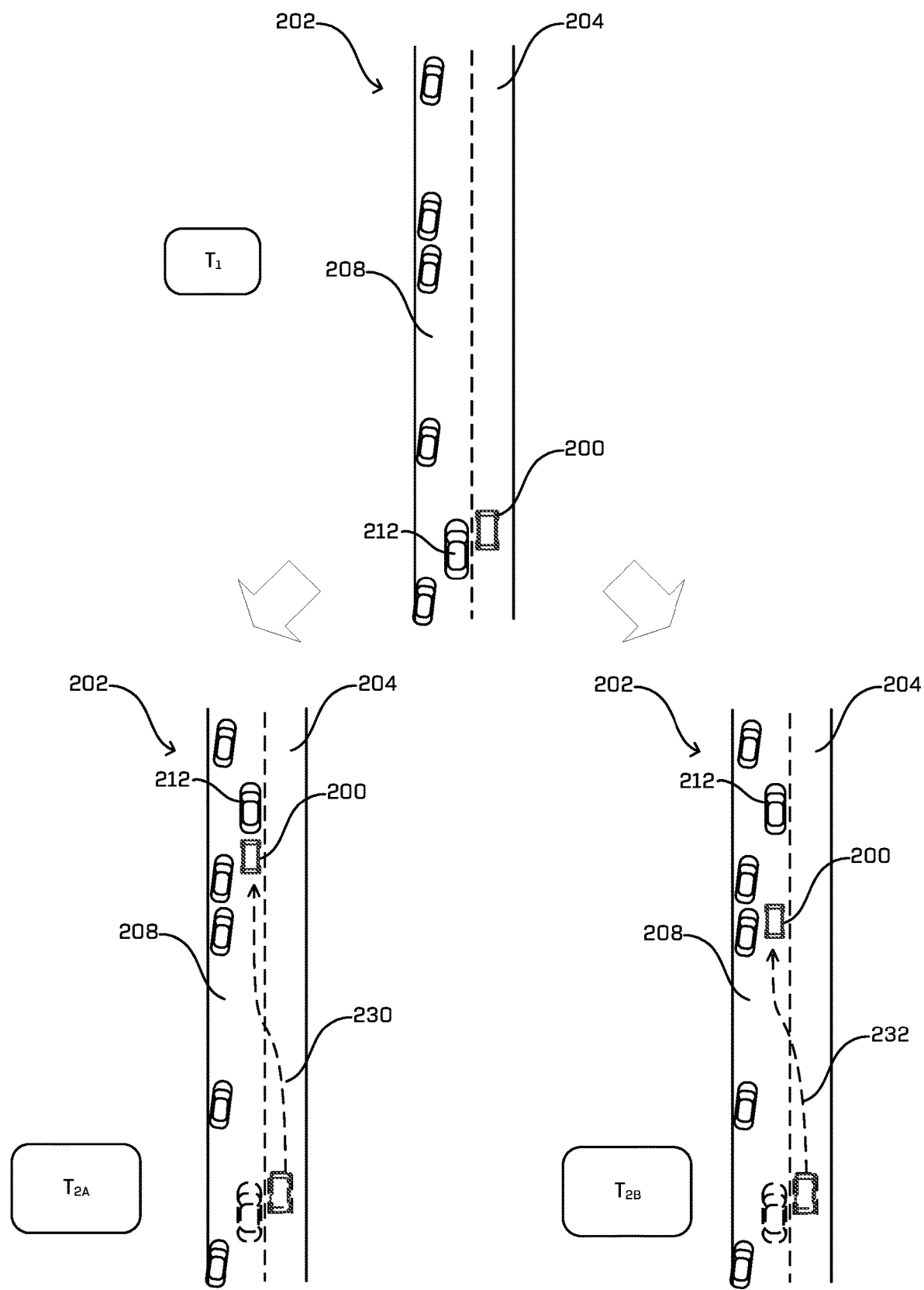
FIG. 2C illustrates additional details associated with FIGS. 2A and 2B.

FIGS. 2A and 2B illustrate examples of determining a trajectory for controlling a vehicle to perform a lane change operation, as described herein. FIG. 2C illustrates a top-down view of the examples described in FIGS. 2A and 2B. In FIGS. 2A and 2B, a vehicle 200 can be positioned in an environment 202 (a top down view of which is illustrated in FIGS. 2A and 2B). In at least one example, the vehicle 200 can be positioned in a first lane 204 of a driving surface 206 and can be associated with an intent to perform a lane change operation to merge into a second lane 208 of the driving surface 206. In at least one example, the vehicle 200 can be travelling along a current trajectory 210. In at least one example, the current trajectory 210 can represent a "route" of the vehicle 200 and can be used to determine longitudinal(s) and/or or lateral (ey) parameters, as described herein. In at least one example, an object (e.g., another vehicle 212) can be positioned in the second lane 208. In at least one example, the other vehicle 212 can be travelling along a trajectory 214.

As described above, gap(s) can be determined by solving a constraints satisfaction problem. That is, a gap finding problem can be modeled as a constraints satisfaction problem to find gap(s) that the vehicle 200 can move into (e.g., in a target lane) with no or minimal interaction with object(s) in the environment 202 and/or without violating other constraint(s) associated with the environment 202.

In some examples, a constraint can be determined based on sensor data associated with the environment 202. For example, the vehicle 200 can be associated with sensor component(s) that can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), time-of-flight (ToF) sensors, seat sensors, seatbelt sensors, weight sensors, etc. The sensor component(s) can generate sensor data and, in some examples, can provide input to vehicle computing device(s) associated with the vehicle 200, as described below with reference to FIG. 4.

In some examples, the sensor data can represent the environment 202 within which the vehicle 200 is positioned. In at least one example, a perception component of the vehicle computing device(s) of the vehicle 200 can detect object(s) in the environment 202, such as the other vehicle 212. In at least one example, a prediction component of the vehicle computing device(s) of the vehicle 200 can predict behavior(s) associated with detected object(s). A predicted behavior of an object can be associated with a trajectory of that object and, in some examples, object data can be determined for the object based at least in part on the trajectory. Such object data can include position (e.g., longitudinal offset from the trajectory 210 of the vehicle 200, lateral offset from the trajectory 210, velocity (e.g., relative to the trajectory 210, etc.). In at least one example, an object can be associated with a distance-time constraint that it imposes in the environment 202, that can be determined based at least in part on the object data. Further, an object can be associated with a vehicle dynamic constraint, that can be determined based at least in part on velocity and/or acceleration. In at least one example, a predicted behavior of an object, which can be modeled as a distance-time constraint and/or vehicle dynamic constraint in a coordinate space, as described below, can be used to determine gaps(s) for performing a lane change operation. That is, a representation of an object can be modeled (e.g., projected) in a coordinate space. Such a representation can correspond to a "constraint space" associated with the object. The representation can correspond to a constraint in a constraints satisfaction problem and can be used for determining gap(s) in the environment 202.

In at least one example, a constraint can be determined based on map data associated with the environment 202. Map data can be associated with map(s) of the environment 202. A map can be any number of data structures that are capable of providing data about an environment, such as, but not limited to, topologies (such as junctions, lanes, merging zones, etc.), streets, mountain ranges, roads, terrain, and the environment in general. Maps can be associated with real environments or simulated environments. In some examples, a static object can be denoted in map data, which can be associated with a constraint as described herein. In an example, a speed limit can be denoted in map data, which can be associated with a constraint as described herein. In some examples, junction space and/or lane endings can be denoted in map data, which can be associated with constraint(s) as described herein. In at least one example, individual of the constraints associated with the map data can be associated with a distance-time constraint that it imposes in the environment 202. Further, individual of the constraints can be associated with a vehicle dynamic constraint, based at least in part on velocity and/or acceleration. In at least one example, such a distance-time constraint and/or vehicle dynamic constraint can be modeled (e.g., projected) in a coordinate space, as described below, and can be used to determine gaps(s). That is, a representation of a constraint can be modeled (e.g., projected) in a coordinate space. Such a representation can correspond to a "constraint space" associated with the constraint. The representation can correspond to a constraint in a constraints satisfaction problem and can be used for determining gap(s) in the environment 202.

In at least one example, a representation of the vehicle 200 can be modeled (e.g., projected) in a coordinate space. In at least one example, such a representation can correspond to a space in the environment 202 in which the vehicle 200 is capable of moving. In some examples, this space can correspond to a configuration space representative of a set of positions the vehicle 200 can have over time. In at least one example, the configuration space can be determined based at least in part on a capability of a vehicle. In at least one example, such a capability can be determined based at least in part on vehicle data, which can include, a position of the vehicle 200 (e.g., longitudinal distance (s), lateral distance (ey), etc.), a maximum acceleration of the vehicle 200, a maximum deceleration of the vehicle 200, and/or a speed constraint (e.g., maximum speed the vehicle 200 is permitted to travel, which can be based on map data and/or internal configurations of the vehicle 200). Such a maximum acceleration and deceleration is depicted in FIG. 2A as the substantially conical shape outlined in each of the three graphs described below.

In at least one example, the gap finder component of the vehicle computing device(s) can model representations of constraints and/or the vehicle 200, as described above, in a coordinate space. That is, representations of constraints and/or the vehicle 200 can be projected into the coordinate space. In at least one example, the coordinate space can be associated with position, which can be represented by longitudinal distance (s), and time (t). An example graph 216, representative of the coordinate space with one or more representations modeled therein, is illustrated in FIG. 2A. Such a graph is provided for illustrative purposes and may not be required for implementation.

In at least one example, to reduce the dimension and problem complexity—and thereby enable techniques described herein to be performed efficiently—one of the distance parameters, the lateral distance (ey), can be omitted and instead approximated with three phases, wherein each phase can represent a portion of the environment 202 with a constant lateral width. In at least one example, the lateral distance (ey) range can be determined based at least in part on a planning distance (e.g., an output of a planner component of the vehicle computing device(s)) and a time horizon. In at least one example, a first phase, a "prepare phase," can be associated with a current lateral distance (ey) of the vehicle 200 that can be offset with parameterized width. That is, the prepare phase can be associated with a portion of the environment 202 that corresponds to the first lane 204. In at least one example, a second phase, a "merge phase," can be associated with a combined result of the lateral distance (ey) range of the prepare phase and a "target phase," as described below. The merge phase can correspond to a portion of the environment 202 associated with the first lane 204 and the second lane 208. In at least one example, a third phase, the "target phase," can be associated with a target lane (e.g., the second lane 208) center offset with parameterized width. That is, the target phase can correspond to a portion of the environment 202 that corresponds to the second lane 208. While three phases are described, the lateral distance (ey) can be replaced with any number of phases, each of which can be associated with their own lateral distance (ey) range. Furthermore, in some examples, the lateral distance (ey) can be modeled with the longitudinal distance (s) and time (t) in a multi-dimensional coordinate space (e.g., a Euclidean coordinate space) instead of, or in addition to, being modeled as described herein.

In at least one example, a portion of the environment 202 corresponding to each of the phases can be modeled in the coordinate space. The graph 216 represents the prepare phase modeled in the coordinate space. A graph 218 represents the merge phase modeled in the coordinate space. A graph 220 represents the target phase modeled in the coordinate space. Again, the graphs are provided for illustrative purposes and may not be required for implementation.

In at least one example, individual of the constraints (e.g., object(s) and/or other constraints) can be modeled in individual of the graphs 216-220. In some examples, one or more extents associated with object(s) and/or other constraint(s) in the environment 202 can be inflated (e.g., a length of an object can be inflated by a half vehicle length of the vehicle 200) when modeled in the coordinate space to streamline gap determination as described herein. In the graph 216 that is associated with the prepare phase, a visualization limit (s limit) can be associated with the prepare phase (e.g., as illustrated by the horizontal line 221 in the graph 216). The graph 216 can additionally include a representation 222 of the vehicle 200. In at least one example, the representation 222 of the vehicle 200 can be determined based at least in part on vehicle data, which can include, a position of the vehicle 200 (e.g., longitudinal distance (s), lateral distance (ey), etc.), a maximum acceleration of the vehicle 200, a maximum deceleration of the vehicle 200, and/or a speed constraint (e.g., maximum speed the vehicle 200 is permitted to travel, which can be based on map data and/or internal configurations of the vehicle 200). In at least one example, the representation 222 of the vehicle 200 can be associated with an upper bound, which can be associated with a maximum acceleration of the vehicle 200, and a lower bound, which can be associated with a maximum deceleration of the vehicle 200 (which, in at least some examples, may be limited to stopping the vehicle 200 and not moving in the reverse direction). In at least one example, the space between the upper bound and the lower bound can represent the configuration space, or the space within the environment 202 in which the vehicle 200 is capable of moving. In some examples, the vehicle 200 can be treated as a point for purposes of comparison as described herein.

In the graph 220 that is associated with the target phase, a representation 224 of the other vehicle 212 is modeled, as well as the representation 222 of the vehicle 200 and the speed limit. That is, in the target phase, another object (e.g., the other vehicle 212) and the predicted behavior of the other object can be considered to ensure the vehicle 200 can perform the lane change operation with no or minimal interaction with the other vehicle 212. In at least one example, the representation 224 can correspond to a "constraint space" associated with the other vehicle 212 and can represent a region through which the vehicle 200 is unable to travel. In at least one example, the representation 224 of the other vehicle 212 can comprise boundaries associated with the other vehicle 212 that, in some examples, can be determined based at least in part on a vehicle following model relative to the vehicle 200. In at least one example, the lower boundary can represent a maximal position over time that the vehicle 200 can reach when following the other vehicle 212 and the upper boundary can represent a minimal position over time that the vehicle 200 can reach when the vehicle 200 is in front of the other vehicle 212. The upper boundary and the lower boundary can be determined based at least in part on a predicted behavior of the other vehicle 212, which can be determined based at least in part on the trajectory 214 associated therewith.

In the graph 218 that is associated with the target phase, the representation 222 of the vehicle 200 and the representation 224 of the other vehicle 212 can be modeled in the coordinate space. That is, the graph 218 can comprise a combination of the graph 216 and the graph 220.

In at least one example, space(s) of the environment 202 associated with where the constraints (e.g., portions between regions associated with objects, environmental factors, speed limits, and/or the like) overlap the configuration space can be cropped out or removed so that such space(s) are not part of a gap. Such space(s) can indicate where the configuration space violates a constraint. The remaining portion of the configuration space, which can indicate that the vehicle 200 can perform the lane change operation with no or minimal interaction and/or without otherwise violating a constraint associated with the environment 202, can be defined as a "gap." In some examples, the gap finder component can determine, as a gap in the environment 202, a portion of the configuration space that is exclusive of constraint space(s). That is, the gap finder component can crop space(s) of the environment 202 that are associated with overlapping representations of constraint(s) and configuration space to identify gap(s) in the environment 202. The remaining configuration space data can be a gap. In the graphs 216-220, the shaded regions 226 and 228 correspond to gaps in the environment 202 wherein the vehicle 200 can perform the lane change operation with no or minimal interaction with other object(s) (e.g., the other vehicle 212) and/or without violating any other constraint(s). That is, the shaded region 226 can represent a first gap in the first lane 204 and the shaded region 228 can represent a second gap in the second lane 208. As described above, in some examples, individual of the gaps can be associated with a cost that can indicate a quality of the gap. In some examples, the cost can be determined based at least in part on the area or size of the gap.

In at least one example, by removing space(s) that are not gap(s) (e.g., portion(s) of the configuration space that violate a constraint), the gap finder component can limit the space within which planner component can search to determine a valid trajectory for performing the lane change operation. In at least one example, the planner component can compare a trajectory 230 with the gap(s) to determine whether the trajectory 230 is associated with the gap(s) in each phase of the lane change operation. That is, the planner component can determine whether the trajectory 230 is within the shaded region 226 of the graph 216 and the shaded region 228 of the graphs 218 and 220. Based at least in part on determining that the trajectory 230 is associated with a gap in each phase, the trajectory 230 can be determined to be a valid trajectory that can be used by the planner component to cause the vehicle 200 to perform the lane change operation.

As described above, in some examples, different trajectories can be compared to identified gap(s) in each of the phases to determine whether individual of the trajectories are "valid" (such that the particular trajectory is associated with a gap in each phase). In some examples, as described above, a cost can be determined for each trajectory. A cost can be based at least in part on a length of the trajectory in each of the phases, an amount of time associated with performing the lane change operation, an amount of time in the first lane 204, a distance travelled during the lane change operation, a relative distance between the vehicle 200 and other object(s) and/or constraint(s), etc. In some examples, a sub-cost can be determined for a trajectory for each phase described above and the cost can be determined by each of the sub-costs.

FIG. 2B illustrates an example wherein another trajectory 232 can be compared to the gaps 222 and 224 in each of the phases. In FIG. 2A, the distance between the trajectory 230 and the upper bound of the representation 222 of the vehicle 200 (e.g., in graph 216) and between the trajectory 230 and the lower bound of the representation 224 of the other vehicle 212 (e.g., in graphs 218 and 220) is less than the distance between the trajectory 232 and the upper bound of the representation 222 of the vehicle 200 (e.g., in graph 216) and between the trajectory 232 and the lower bound of the representation 224 of the other vehicle 212 (e.g., in graphs 218 and 220). As such, the cost associated with the trajectory 230 may be higher than the cost associated with the trajectory 232. As such, the trajectory 232 can minimize cost associated with performing the lane change operation and can therefore represent a better trajectory for performing the lane change operation (e.g., because the vehicle 200 can perform the operation with more distance between it and the other vehicle 212). In such an example, the planner component can determine to use the trajectory 232 instead of the trajectory 230 to control the vehicle 200 to perform the lane change operation.

FIG. 2C illustrates a top-down view of the environment 202 at different times. At a first time (Ti), the vehicle 200 is positioned in the first lane 204 and is associated with an intent to perform a lane change operation into the second lane 208. In at least one example, the other vehicle 212 is in the second lane 208 and can be a constraint as described herein. The trajectories 230 and 232, referenced above with respect to FIGS. 2A and 2B respectively, are illustrated in FIG. 2C. As illustrated, both of the trajectories 230 and 232 enable the vehicle 200 to perform the lane change operation, but the trajectory 232 (referenced in FIG. 2B) provides more longitudinal distance (s) between the vehicle 200 and the other vehicle 212 than the trajectory 230 (referenced in FIG. 2A). As such, the trajectory 232 can be associated with a lower cost than the trajectory 230 and thus can be determined to be the trajectory for controlling the vehicle 200 to perform the lane change operation.

While two trajectories are illustrated in FIGS. 2A-2C, in practice, tens, hundreds, or thousands of trajectories (e.g., "potential trajectories") can be compared to the identified gap(s) to determine associated costs. In at least one example, a trajectory with a lowest cost (e.g., the trajectory that minimizes costs associated with the lane change operation) can be determined and used for generating commands for controlling the vehicle 200 to perform the lane change operation. In some examples, instead of comparing potential trajectory(s) to the gap(s), a trajectory can be generated based at least in part on the gap(s). That is, the gaps(s) can be provided as an input to the planner component, which can generate a new trajectory based at least in part on the gap(s). While the planner component is described as generating trajectories, in some examples, the gap finder component can generate trajectories that can be provided to the planner component.

Figure 3:
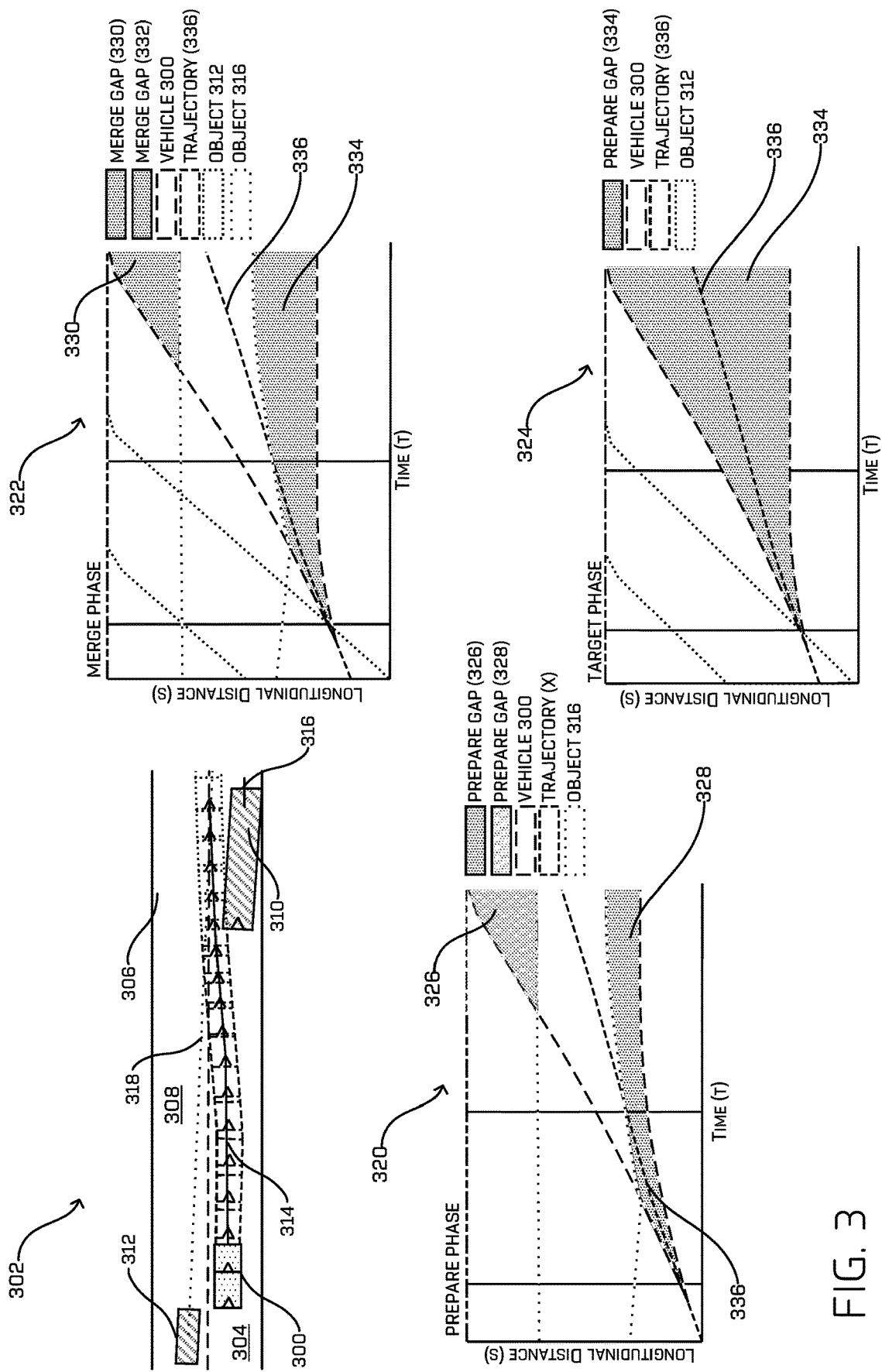
FIG. 3 illustrates another example of determining a trajectory for controlling a vehicle to perform a lane change operation, as described herein.

FIG. 3 illustrates another example of determining a trajectory for controlling a vehicle to perform a lane change operation, as described herein. In FIG. 3, a vehicle 300 is positioned in an environment 302 (a top down view of which is illustrated in FIG. 3). The vehicle 300 can be positioned in a first lane 304 of a driving surface 306 and can be associated with an intent to perform a lane change operation into a second lane 308 of the driving surface 306. In FIG. 3, a first object 310 (e.g., a stopped bus) is in the first lane 304 (in front of the vehicle 300) and a second object 312 (e.g., another vehicle) is in the second lane 308. The vehicle 300 can be associated with a trajectory 314, the first object 310 can be associated with a trajectory 316, and the second object 312 can be associated with a trajectory 318.

In at least one example, a representation of the first object 310, the second object 312, the vehicle 300, and any other constraints can be modeled (e.g., projected) in a coordinate space, as described above with reference to FIGS. 2A and 2B. That is, each object and/or other constraint can be associated with a distance-time constraint and/or vehicle dynamic constraint that can be modeled (e.g., projected) in the coordinate space and the configuration space of the vehicle 300 can be modeled in the coordinate space. As described above, the coordinate space can be associated with a longitudinal distance (s) and time (t). In some examples, the lane change operation can be modeled in three phases: a prepare phase, a merge phase, and a target phase, which can represent three lateral distance (ey) ranges. Graphs representative of each phase 314, 316, and 318 are illustrated in FIG. 3. As stated above, the graphs 320-324 are provided for illustrative purposes and may not be required for implementation.

In at least one example, as described above with reference to FIGS. 2A and 2B, a representation of the first object 310, the second object 312, the vehicle 300, and any other constraints can be modeled (e.g., projected) into a coordinate space, as described above. Such representations can be based at least in part on a distance-time constraints and/or vehicle dynamic constraints associated with the individual object(s) and/or other constraints. In at least one example, a representation of an object and/or a constraint can be associated with an upper bound and a lower bound. In at least one example, a representation of an object and/or other constraint can be used to determine gaps(s).

In at least one example, the representation of the vehicle 300, which can be associated with the configuration space of the vehicle 300, can be analyzed in view of other object(s) and/or constraint(s) modeled in the coordinate space. In at least one example, spaces of overlap between the configuration space and space(s) corresponding to representations of other object(s) and/or constraint(s) can be extracted. Remaining space(s) can be determined to be "gap(s)." In FIG. 3, a first gap is represented by a first shaded region 326 and a second gap is represented by a second shaded region 328 in the prepare phase (e.g., in the graph 320), a third gap is represented by a third shaded region 330 and a fourth gap is represented by a fourth shaded region 332 in the merge phase (e.g., in the graph 322), and a fifth gap is represented by a fifth shaded region 334 in the target phase (e.g., in the graph 324).

In at least one example, a trajectory 336 can be evaluated to determine if the trajectory 336 is associated with a gap in each phase. Here, the trajectory 336 is associated with a gap in each phase and thus, can be determined to be a valid trajectory. In at least one example, the trajectory 336 can be used to control the vehicle 300 to perform the lane change operation. In some examples, a cost can be determined for the trajectory 336 and the cost can be compared to a threshold. Based at least in part on determining that the cost is below a threshold, the trajectory 330 can be used to control the vehicle 300. In some examples, if the cost meets or exceeds the threshold, another trajectory can be compared to the gap(s) identified as described above.

Figure 4:
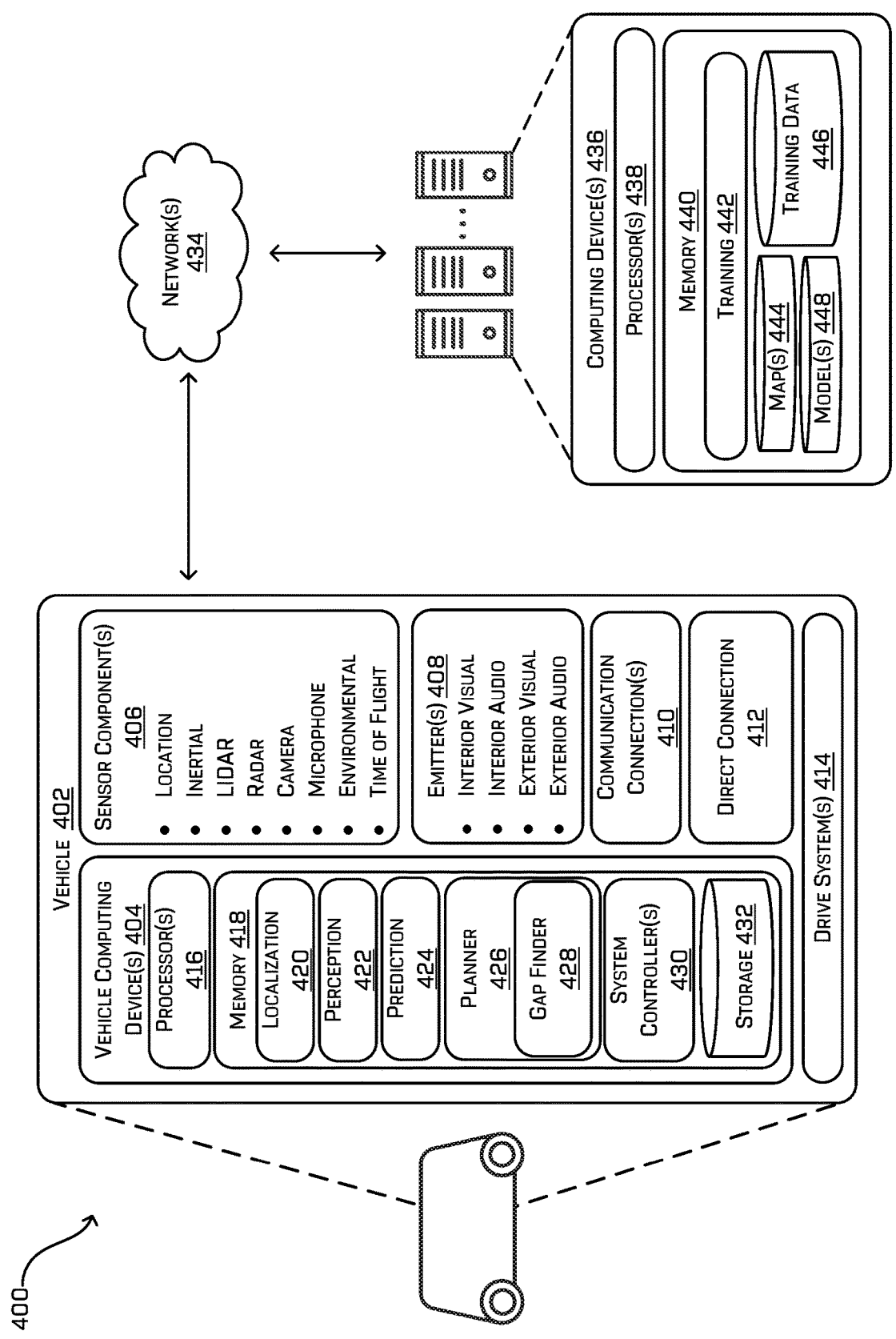
FIG. 4 is a block diagram illustrating an example system for performing techniques, as described herein.

FIG. 4 is a block diagram illustrating an example system 400 for performing techniques, as described herein. In at least one example, a vehicle 402 can include one or more vehicle computing devices 404, one or more sensor components 406, one or more emitters 408, one or more communication connections 410, at least one direct connection 412, and one or more drive systems 414. In at least one example, a vehicle 402 can correspond to the vehicle 102 described above with reference to FIG. 1, the vehicle 200 described above with reference to FIG. 2, and/or the vehicle 300 described above with reference to FIG. 3. In some examples, the vehicle 402 can be an autonomous vehicle. That is, the vehicle 402 can be an autonomous vehicle configured to operate according to a Level 5 classification issued by the U.S. National Highway Traffic Safety Administration, which describes a vehicle capable of performing all safety-critical functions for an entire trip, with the driver (or occupant) not being expected to control the vehicle at any time. In such an example, since the vehicle 402 can be configured to control all functions from start to stop, including all parking functions, it can be driverless. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 402 is an autonomous vehicle; however, the vehicle 402 could be any other type of vehicle. While only a single vehicle 402 is illustrated in FIG. 4, in a practical application, the example system 400 can include a plurality of vehicles, which, in some examples, can comprise a fleet of vehicles.

The vehicle computing device(s) 404 can include processor(s) 416 and memory 418 communicatively coupled with the processor(s) 416. In the illustrated example, the memory 418 of the vehicle computing device(s) 404 stores a localization component 420, a perception component 422, a prediction component 424, a planner component 426, which can include a gap finder component 428, and one or more system controllers 430. Additionally, the memory 418 can include a storage 432, which can store map(s), model(s), etc. A map can be any number of data structures that are capable of providing data about an environment, such as, but not limited to, topologies (such as junctions, lanes, merging zones, etc.), streets, mountain ranges, roads, terrain, and the environment in general. Maps can be associated with real environments or simulated environments. Model(s) can include machine-trained models, as described below.

In at least one example, the localization component 420 can determine a pose (position and orientation) of the vehicle 402 in relation to a local and/or global map based at least in part on sensor data received from the sensor component(s) 406 and/or map data associated with a map (e.g., of the map(s)). In at least one example, the localization component 420 can include, or be associated with, a calibration component that is capable of performing operations for calibrating (determining various intrinsic and extrinsic parameters associated with any one or more of the sensor component(s) 406), localizing, and mapping substantially simultaneously.

In at least one example, the perception component 422 can perform object detection, segmentation, and/or classification based at least in part on sensor data received from the sensor component(s) 406. In at least one example, the perception component 422 can receive raw sensor data (e.g., from the sensor component(s) 406). In at least one example, the perception component 422 can receive sensor data and can utilize one or more processing algorithms to perform object detection, segmentation, and/or classification with respect to object(s) identified in the sensor data. In some examples, the perception component 422 can associate a bounding space (or otherwise an instance segmentation) with an identified object and can associate a confidence metric associated with a classification of the identified object with the identified object. In some examples, objects, when rendered via a display, can be colored based on their perceived class.

The prediction component 424 can receive sensor data from the sensor component(s) 406, map data associated with a map (e.g., of the map(s) which can be in storage 442), and/or perception data output from the perception component 422 (e.g., processed sensor data), and can output predictions associated with one or more objects within the environment of the vehicle 402. In at least one example, the planner component 426 can determine outputs, to use to control the vehicle 402 based at least in part on sensor data received from the sensor component(s) 406, map data, and/or any determinations made by the other components of the vehicle 402. In at least one example, such outputs can correspond to trajectories, as described herein. In some examples, the planner component 426 can receive outputs from the gap finder component 428 (e.g., gap(s), as described above) and can compare trajectories to the outputs of the gap finder to determine trajectories for controlling the vehicle 402.

In at least one example, the gap finder component 428 can perform operations as described above with reference to FIGS. 1-3 and FIGS. 5 and 6 below. That is, the gap finder component 428 can utilize vehicle data associated with the vehicle 402 (e.g., a current position of the vehicle 402 and a current route of the vehicle 402), object data associated with other object(s) in the environment of the vehicle 402 and/or trajectory(s) associated therewith, other constraint(s) associated with the environment and/or the vehicle 402, etc. as described above, to output gap(s) that indicate how the vehicle 402 can merge into a target lane. As described above, the gap finder component 428 can model constraints in a coordinate space representative of an environment and determine gap(s) based on such constraints. As described above, the gap finder component 428 an solve for a constraints satisfaction problem to determine gap(s) in the environment that can indicate how the vehicle 402 can merge into a target lane.

Additional details of localization components, perception components, prediction components, and/or planner components that are usable can be found in U.S. Pat. No. 9,612,123, issued on Apr. 4, 2017, and U.S. Pat. No. 10,353,390, issued on Jul. 16, 2019, the entire contents of both of which are incorporated by reference herein. In some examples (e.g., where the vehicle 402 is not an autonomous vehicle), one or more of the aforementioned components can be omitted from the vehicle 402. While the components described above are illustrated as "onboard" the vehicle 402, in other implementations, the components can be remotely located and/or accessible to the vehicle 402. Furthermore, while the components are described above as "components," such components can comprise one or more components, which can be part of a system, for performing operations attributed to each of the components.

In at least one example, the localization component 420, the perception component 422, the prediction component 424, and/or the planner component 426 can process sensor data and can send their respective outputs over network(s) 434, to computing device(s) 436. In at least one example, the localization component 420, the perception component 422, the prediction component 424, and/or the planner component 426 can send their respective outputs to the computing device(s) 436 at a particular frequency, after a lapse of a predetermined period of time, in near real-time, etc.

In at least one example, the vehicle computing device(s) 404 can include one or more system controllers 440, which can be configured to control steering, propulsion, braking, safety, emitters, communication, and other systems of the vehicle 402. These system controller(s) 440 can communicate with and/or control corresponding systems of the drive system(s) 414 and/or other systems of the vehicle 402.

In at least one example, the sensor component(s) 406 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), time-of-flight (ToF) sensors, seat sensors, seatbelt sensors, weight sensors, etc. The sensor component(s) 406 can provide input to the vehicle computing device(s) 404. In some examples, the sensor component(s) 406 can preprocess at least some of the sensor data prior to sending the sensor data to the vehicle computing device(s) 404. In at least one example, the sensor component(s) 406 can send sensor data, via the network(s) 434, to the computing device(s) 436 at a particular frequency, after a lapse of a predetermined period of time, in near real-time, etc.

The vehicle 402 can also include one or more emitters 408 for emitting light and/or sound. The emitter(s) 408 in this example include interior audio and visual emitters (e.g., display(s), speaker(s), etc.) to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 408 can be positioned at various locations about the exterior and/or interior of the vehicle 402.

The vehicle 402 can also include communication connection(s) 410 that enable communication between the vehicle 402 and other local or remote computing device(s). For instance, the communication connection(s) 410 can facilitate communication with other local computing device(s) on the vehicle 402 and/or the drive system(s) 414. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote services.

The communications connection(s) 410 can include physical and/or logical interfaces for connecting the vehicle computing device(s) 404 to another computing device or a network, such as network(s) 434. For example, the communications connection(s) 410 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

The direct connection 412 can directly connect the drive system(s) 414 and other systems of the vehicle 402.

In at least one example, the vehicle 402 can include drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include sensor component(s) to detect conditions of the drive system(s) 414 and/or the surroundings of the vehicle 402. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 414. In some cases, the sensor component(s) on the drive system(s) 414 can overlap or supplement corresponding systems of the vehicle 402 (e.g., sensor component(s) 406).

The drive system(s) 414 can include many of the vehicle systems, including a high voltage battery, a motor to propel the vehicle 402, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 414. Furthermore, the drive system(s) 414 also include communication connection(s) that enable communication by the respective drive system with other local or remote computing device(s).

In FIG. 4, the vehicle computing device(s) 404, sensor component(s) 406, emitter(s) 408, and the communication connection(s) 410 are shown onboard the vehicle 402. However, in some examples, the vehicle computing device(s) 404, sensor component(s) 406, emitter(s) 408, and the communication connection(s) 410 can be implemented outside of an actual vehicle (i.e., not onboard the vehicle 402). Furthermore, in some examples, aspects of the vehicle computing device(s) 404 can be distributed within the vehicle and/or other computing device(s) 436.

As described above, the vehicle 402 can send sensor data to the computing device(s) 436, via the network(s) 434. In some examples, the vehicle 402 can send raw sensor data to the computing device(s) 436. In other examples, the vehicle 402 can send processed sensor data and/or representations of sensor data to the computing device(s) 436 (e.g., data output from the localization component 420, the perception component 422, the prediction component 424, and/or the planner component 426). In some examples, the vehicle 402 can send sensor data to the computing device(s) 436 at a particular frequency, after a lapse of a predetermined period of time, in near real-time, etc. In some examples, such data can be associated with "logs" that can represent previous, or historical, behavior of the vehicle 402 over time.

The computing device(s) 436 can receive the sensor data (raw or processed) from the vehicle 402 and/or other data collection devices, as well as data from one or more third party sources and/or systems. In at least one example, the computing device(s) 436 can include processor(s) 438 and memory 440 communicatively coupled with the processor(s) 438. In the illustrated example, the memory 440 of the computing device(s) 436 stores a training component 442, map(s) 444 (e.g., storing one or more maps), training data 446 (e.g., storing training data accessible to the training component 442), and model(s) 448 (e.g., models output by the training component 442). In some examples, one or more of the systems and/or storage repositories can be associated with the vehicle 402 or other computing device(s) associated with the system 400 instead of, or in addition to, being associated with the memory 440 of the computing device(s) 436.

In at least one example, the training component 442 can train model(s) based at least in part on the training data, which can be used for various operations as described herein. For example, the training component 442 can train model(s), using machine learning algorithms, that can be used by the localization component 420, the perception component 422, the prediction component 424, and/or the planner component 426, for example. Such machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), other Deep Belief Networks (DBN), Artificial Neural Network (ANN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), SVM (support vector machine), supervised learning, unsupervised learning, semi-supervised learning, etc. In at least one example, the resulting model(s) can be stored in the model(s) 444 and/or the storage 432 on the vehicle 402 and can be accessed in near real-time by one or more components of the vehicle computing device(s) 404.

The processor(s) 416 of the vehicle 402 and the processor(s) 438 of the computing device(s) 442 can be any suitable processor capable of executing instructions to process data and perform operations as described herein. By way of example and not limitation, the processor(s) 416 and 438 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 440 are examples of non-transitory computer-readable media. Memory 418 and 440 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing data. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in some examples, components of the vehicle 402 can be associated with the computing device(s) 436 and/or the components of the computing device(s) 436 can be associated with the vehicle 402. That is, the vehicle 402 can perform one or more of the functions associated with the computing device(s) 436, and vice versa. Furthermore, in some examples, processing as described herein can be distributed across multiple processors (e.g., GPUs) for quick integration. In at least one example, each of the processors (e.g., GPUs) can process in parallel to speed up the time required for performing operations described herein.

Furthermore, while the vehicle computing device(s) 404 and the computing device(s) 436 are shown to include multiple components, in some examples, such components can be associated with more or fewer individual components. For example, in an example, a localization component, a perception component, a prediction component, and/or a planner component can be combined into a single component. Or, an evaluation component, a simulation component, and/or a training component can be combined into a single component. That is, while depicted as separate components, any one or more of the components can be combined.

Figure 5:
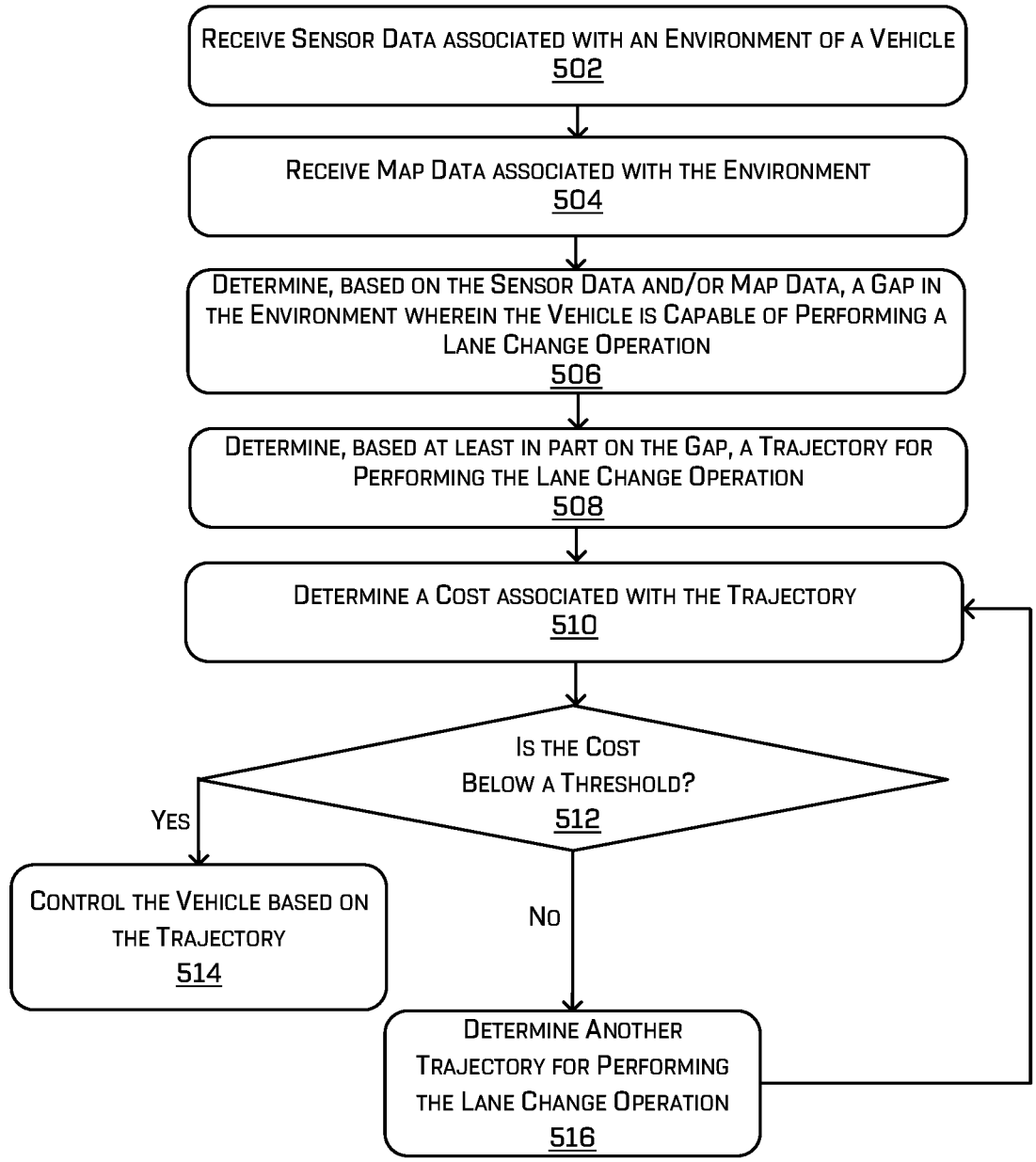
FIG. 5 illustrates an example process for determining a trajectory for controlling a vehicle to perform a lane change operation, as described herein.
Figure 6:
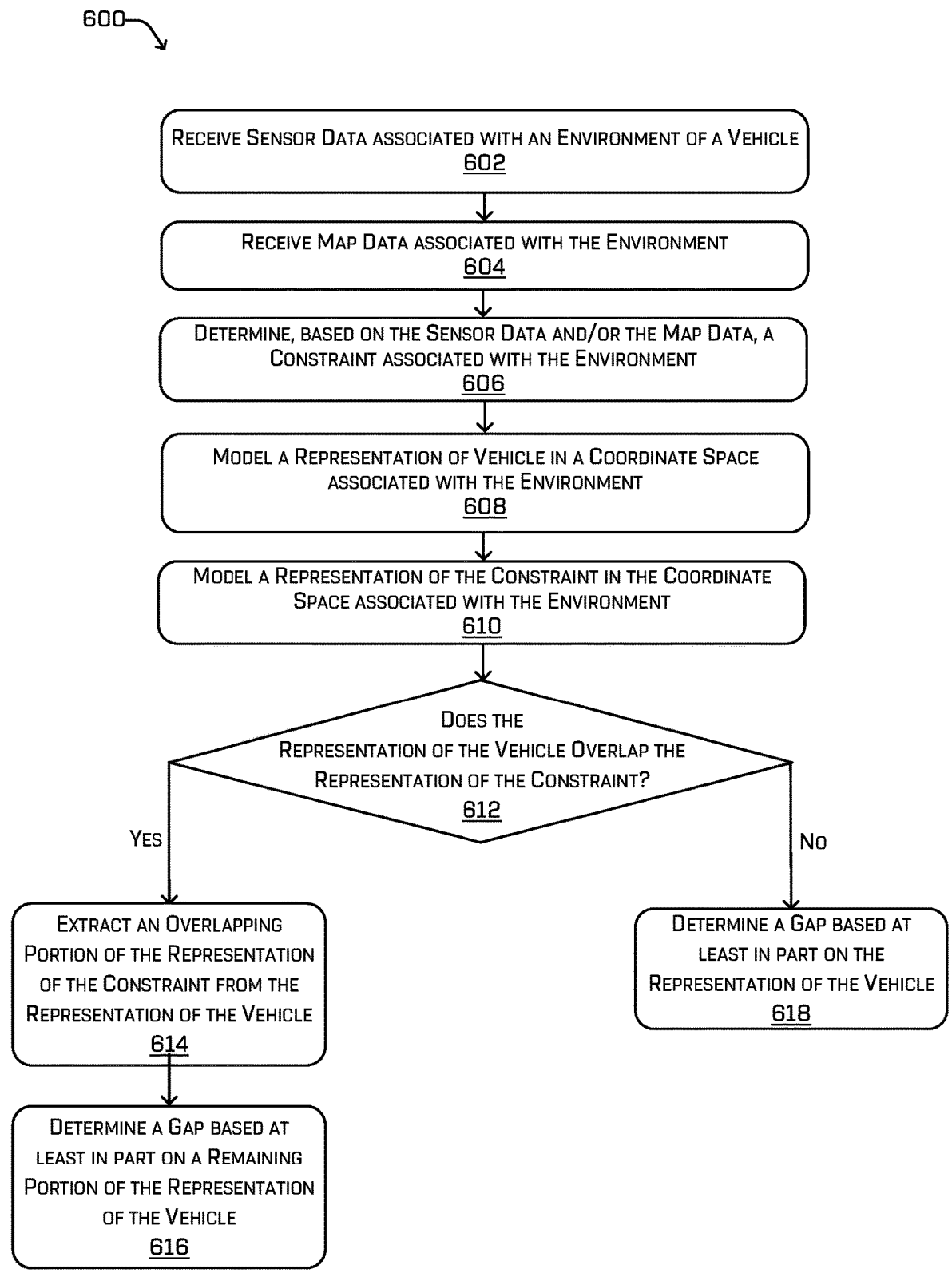
FIG. 6 illustrates an example process for determining a gap, as described herein.

FIGS. 5 and 6 are flowcharts showing example processes involving techniques as described herein. The processes illustrated in FIGS. 5 and 6 are described with reference to the system 400 shown in FIG. 4 for convenience and ease of understanding. However, the processes illustrated in FIGS. 5 and 6 are not limited to being performed using the system 400. Moreover, the system 400 described herein is not limited to performing the processes illustrated in FIGS. 5 and 6.

The processes 500 and 600 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes 500 and 600 can be combined in whole or in part with each other or with other processes.

FIG. 5 illustrates an example process 500 for determining a trajectory for controlling a vehicle to perform a lane change operation, as described herein.

At operation 502, the gap finder component 428 can receive sensor data associated with an environment of a vehicle. As described above, the vehicle 402 can be associated with sensor component(s) 406 that can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), time-of-flight (ToF) sensors, seat sensors, seatbelt sensors, weight sensors, etc. The sensor component(s) 406 can generate sensor data and, in some examples, can provide input to vehicle computing device(s) 404 associated with the vehicle 402. In at least one example, the gap finder component 428 can receive sensor data from the sensor component(s) 406 and/or other component(s) of the vehicle computing device(s) 404 (e.g., the perception component 422, etc.).

At operation 504, the gap finder component 428 can receive map data associated with the environment. As described above, map data can be associated with map(s) of the environment. A map can be any number of data structures that are capable of providing data about an environment, such as, but not limited to, topologies (such as junctions, lanes, merging zones, etc.), streets, mountain ranges, roads, terrain, and the environment in general. Maps can be associated with real environments or simulated environments. In at least one example, the gap finder component 428 can receive map data associated with the environment.

At operation 506, the gap finder component 428 can determine, based on the sensor data and/or the map data, gap(s) in the environment wherein the vehicle is capable of performing a lane change operation. Additional details associated with determining gap(s) are described below with reference to FIG. 6.

At operation 508, the planner component 426 can determine, based at least in part on the gap(s), a trajectory for performing the lane change operation. In at least one example, the planner component 426 can compare a trajectory with the gap(s) to determine whether the trajectory is associated with individual of the gap(s). In some examples, as described above, a lane change operation can be modeled in different phases. In some examples, each phase can be associated with one or more gaps. In at least one example, the planner component 426 can determine whether the trajectory is associated with a gap in each phase. Based at least in part on determining that the trajectory is associated with a gap in each phase, the trajectory can be determined to be a valid trajectory that can be used by the planner component 426 to cause the vehicle 402 to perform the lane change operation. In some examples, the planner component 426 can generate a trajectory based at least in part on the gap(s).

At operation 510, the planner component 426 can determine a cost associated with the trajectory. In some examples, as described above, the planner component 426 can determine a cost for each trajectory. A cost can be determined based at least in part on a length of the trajectory in each of the phases, an amount of time associated with performing the lane change operation, an amount of time in the current lane, a distance travelled during the lane change operation, a relative distance between the vehicle 402 and other object(s) and/or constraint(s), etc. In some examples, a sub-cost can be determined for a trajectory for each phase described above and the cost can be determined by each of the sub-costs.

At operation 512, the planner component 426 can determine whether the cost is below a threshold. In at least one example, based at least in part on determining that the cost is below the threshold, the planner component 426 can control the vehicle using the trajectory, as illustrated at operation 514. That is, the planner component 426 can determine steering and/or acceleration commands that can be executed by the system controller(s) and/or drive system(s) 414 to cause the vehicle 402 to perform the lane change operation. In at least one example, based at least in part on determining that the cost meets or exceeds the threshold, the planner component 426 can determine another trajectory for performing the lane change operation, as illustrated at operation 516. That is, based at least in part on determining that the trajectory is associated with too high of cost, a different trajectory can be accessed (e.g., from a plurality of trajectories previous generated) and/or generated. Based at least in part on determining the other trajectory, the process 500 can return to operation 510 to determine a cost associated with the other trajectory.

In some examples, a plurality of trajectories (e.g., a plurality of potential trajectories) can be validated in view of the gap(s) identified at operation 506 and, for any trajectory that is not associated with a gap in a phase associated with the lane change operation, such a trajectory may be removed from consideration by the planner component 426. However, for each trajectory that is validated, the planner component 426 can determine a cost associated therewith. In some examples, the plurality of potential trajectories can be sorted based on associated costs and a potential trajectory associated with a lowest cost can be selected to control the vehicle 502.

In at least one example, the process 500 can be performed at a particular frequency, after a lapse of a period of time, and/or the like. In some examples, the process 500 can be performed for each "tick" of route planning. A "tick" can correspond to a period of time after which a trajectory is re-evaluated and/or updated for controlling the vehicle (e.g., 2 milliseconds (ms), 4 ms, etc.).

FIG. 6 illustrates another example process 600 for determine a gap, as described herein.

At operation 602, the gap finder component 428 can receive sensor data associated with an environment of a vehicle, as described above with reference to operation 502 of FIG. 5.

At operation 604, the gap finder component 428 can receive map data associated with the environment, as described above with reference to operation 504 of FIG. 5.

At operation 606, the gap finder component 428 can determine, based on the sensor data and/or the map data, a constraint associated with the environment. In some examples, a constraint can be determined based on sensor data associated with the environment. In at least one example, the perception component 422 can detect object(s)

in the environment. Indication(s) of such object(s) can be provided to the gap finder component 428 which can determine an object in the environment. In at least one example, the prediction component 424 can a predict behavior of the detected object. A predicted behavior of an object can be associated with a trajectory of that object and, in some examples, object data can be determined for the object based at least in part on the trajectory. Such object data can include position (e.g., longitudinal offset from the trajectory of the vehicle 402, lateral offset from the trajectory, velocity (e.g., relative to the trajectory), etc.). Objects, as described above, and their predicted behaviors can be constraints in the environment that can affect the performance of a lane change operation by the vehicle 402.

In at least one example, a constraint can be determined based on map data associated with the environment. As described above, a static object can be denoted in map data, which can be associated with a constraint as described herein. In an example, a speed limit can be denoted in map data, which can be associated with a constraint as described herein. In some examples, junction space and/or lane endings can be denoted in map data, which can be associated with constraint(s) as described herein. Additional or alternative constraint(s) can be denoted in map data.

At operation 608, the gap finder component 428 can model a representation of the vehicle in a coordinate space associated with the environment. In at least one example, a representation of the vehicle 402 can be modeled (e.g., projected) in a coordinate space. In at least one example, the coordinate space, as described above, can be associated with longitudinal distance (s) and time (t). In at least one example, the representation of the vehicle 402 can correspond to a space in the environment in which the vehicle 402 is capable of moving. In some examples, this space can correspond to a configuration space representative of a set of positions the vehicle 402 can have over time. In at least one example, the configuration space can be determined based at least in part on a capability of the vehicle 402. As described above, in some examples, such a capability can be determined based at least in part on vehicle data, which can include, a position of the vehicle 402 (e.g., longitudinal distance (s), lateral distance (ey), etc.), a maximum acceleration of the vehicle 402, a maximum deceleration of the vehicle 402, and/or a speed constraint (e.g., maximum speed the vehicle 402 is permitted to travel, which can be based on map data and/or internal configurations of the vehicle 402). In some examples, the representation of the vehicle 402 can be associated with upper and lower bounds, as described above.

At operation 610, the gap finder component 428 can model a representation of the constraint in the coordinate space associated with the environment. In at least one example, a constraint can be associated with a distance-time constraint that it imposes in the environment. For objects, the distance-time constraint can be determined based at least in part on the object data. In some examples, constraints can be associated with vehicle dynamic constraints, that can be determined based at least in part on velocity and/or acceleration. In at least one example, a representation of the constraint can be modeled (e.g., projected) in the coordinate space with the representation of the vehicle 402. In some examples, the representation of the constraint can be associated with an upper and lower bound, as described above. As described above, such a representation can correspond to a "constraint space" associated with the constraint, which can represent a portion of the environment through which the vehicle 402 is unable to travel at some period of time. While a single constraint is referenced, in some examples, multiple constraints can be modeled in the coordinate space.

As described above, the environment and/or gap(s) associated therewith can be associated with a multi-dimensional space comprising a longitudinal distance (s), a lateral distance (ey), and a time (t). In at least one example, to reduce the dimension and problem complexity—and thereby enable techniques described herein to be performed efficiently—one of the distance parameters, the lateral distance (ey), can be omitted and instead approximated with three phases, wherein each phase can represent a portion of the environment with a constant lateral width. In at least one example, the lateral distance (ey) range can be determined based at least in part on a planning distance (e.g., an output of a planner component of the vehicle computing device(s)) and a time horizon. The three phases described above comprise the prepare phase, the merge phase, and the target phase. While three phases are described, the lateral distance (ey) can be replaced with any number of phases, each of which can be associated with their own lateral distance (ey) range. Furthermore, in some examples, the lateral distance (ey) can be modeled with the longitudinal distance (s) and time (t) in a multi-dimensional coordinate space (e.g., a Euclidean coordinate space) instead of, or in addition to, being modeled as described herein.

At operation 612, the gap finder component 428 can determine whether the representation of the vehicle overlaps the representation of the constraint. In at least one example, the gap finder component 428 can identify space(s) of the environment where the constraint(s) (e.g., constraint space(s)) overlap the configuration space. That is, the gap finder component 428 can identify space(s) of the environment wherein the configuration space violates a constraint. Such space(s) can be represented by an overlap between representation(s) of constraint(s) (e.g., constraint space(s)) and the representation of the vehicle 402 as modeled in the coordinate space.

At operation 614, the gap finder component 428 can extract an overlapping portion of the representation of the constraint from the representation of the vehicle. The gap finder component 428 can crop out or remove an overlapping portion so that the portion of the configuration space that violates the constraint is removed from the search space used by the planner component 428 to determine trajectories for controlling the vehicle 402.

At operation 616, the gap finder component 428 can determine a gap based at least in part on a remaining portion of the representation of the vehicle. In at least one example, the remaining portion of the configuration space, which can indicate that the vehicle 402 can perform the lane change operation with no or minimal interaction and/or without otherwise violating a constraint associated with the environment, can be defined as a "gap." That is, the gap finder component 428 can crop space(s) of the environment that are associated with overlapping representations of constraint(s) and configuration space to identify gap(s) in the environment. The remaining configuration space data can be a gap.

At operation 618, the gap finder component 428 can determine a gap based at least in part on the representation of the vehicle. In at least one example, if the configuration space does not violate a constraint such that the representation of the constraint does not overlap a representation of the vehicle, the gap can be determined based at least in part on the configuration space itself.

In at least one example, by removing space(s) that are not gap(s) (e.g., portion(s) of the configuration space that violate a constraint), the gap finder component can limit the space within which planner component can search to determine a valid trajectory for performing the lane change operation. In at least one example, the planner component 426 can compare one or more trajectories with the gap(s) to determine whether the individual of the one or more trajectories is associated with the gap(s) in each phase of the lane change operation, as described above with reference to FIG. 5. As described above, in some examples, different trajectories can be compared to identified gap(s) in each of the phases to determine whether individual of the trajectories are "valid" (such that the particular trajectory is associated with a gap in each phase). In some examples, as described above, a cost can be determined for each trajectory. A cost can be determined based at least in part on a length of the trajectory in each of the phases, an amount of time associated with performing the lane change operation, an amount of time in the current lane, a distance travelled during the lane change operation, a relative distance between the vehicle 402 and other object(s) and/or constraint(s), etc. In some examples, a sub-cost can be determined for a trajectory for each phase described above and the cost can be determined by each of the sub-costs.

As described above, techniques described herein offer increased efficiency in route planning of vehicles, such as autonomous vehicles, especially in areas of dense traffic. That is, by modeling the environment of the vehicle and identifying gap(s) as described herein, the search space searched by the planner component can be greatly reduced. Such a reduction can enable the search to be performed faster and with more accuracy. That is, gap(s) can be constraint(s) that can limit the scope of the search to enable the planner component to find a solution quicker than in conventional and/or existing techniques. As such, the planner component can generate and/or validate trajectories faster and more efficiently than with conventional and/or existing techniques.

Furthermore, by modeling the environment of the vehicle and identifying gap(s) as described herein, techniques described herein enable improved lane change behavior. Techniques described herein enable consideration of all constraint(s) in an environment, which offers more context for improved decision making with respect to route planning and execution. For example, existing techniques can determine costs associated with staying in a current lane and getting behind a vehicle in a target lane but can exclude other constraints in the environment. Such costs can be hard to tune and may not guarantee a valid solution. Furthermore, in existing techniques, such costs can be associated with a pairwise feature and can lack context to make an informed decision. In some examples, a most conservative route can be determined, which may not be an optimal solution. By utilizing gap(s), as described herein, environmental context can be taken into account when determining trajectories for controlling the vehicle. As such, trajectories output by planner component(s) can be more accurate, feasible, and comfortable (e.g., for a passenger of a vehicle) than trajectories output via conventional or existing techniques.

Example Clauses

A. A method comprising: receiving sensor data from a sensor associated with a vehicle traversing an environment, the environment comprising a first lane associated with a current position of the vehicle and a second lane proximate the first lane; determining, based at least in part on the sensor data, a presence of an object in the environment and a predicted behavior of the object; defining, as a first configuration space and based at least in part on maximum acceleration and a maximum deceleration of the vehicle, a first portion of the first lane; defining, as a second configuration space and based at least in part on the maximum acceleration and the maximum deceleration, a second portion of the second lane; determining, based at least in part on the predicted behavior of the object, the first configuration space, and the second configuration space, a first gap associated with the first lane and a second gap associated with the second lane; determining, based at least in part on the first gap and the second gap, a trajectory for performing a lane change operation; determining a cost associated with the trajectory; and based at least in part on a determination that the cost is below a threshold, controlling the vehicle to perform the lane change operation based at least in part on the trajectory.

B. The method as paragraph A recites, further comprising: determining, based at least in part on a predicted behavior of the object, a distance parameter and a time parameter associated with the object, wherein the distance parameter is determined based at least in part on a position of the object relative to a route frame associated with the vehicle; modeling, based at least in part on the distance parameter and the time parameter, a representation of the object into a coordinate space; and determining at least one of the first gap or the second gap based at least in part on a representation of the object in the coordinate space.

C. The method as paragraph B recites, wherein the object is associated with the second lane, wherein determining the at least one of the first gap or the second gap comprises determining the second gap, and wherein determining the second gap comprises determining, based at least in part on the distance parameter and the time parameter, a portion of the second configuration space that is independent of the object.

D. The method as any of paragraphs A-C recites, further comprising: determining whether the trajectory is valid based at least in part on one or more of the first gap or the second gap, wherein controlling the vehicle to perform the lane change operation based at least in part on the trajectory is further based at least in part on determining that the trajectory is valid.

E. The method as any of paragraphs A-D recites, wherein the cost is associated with at least one of a period of time that the vehicle is associated with the first lane, a period of time associated with the lane change operation, or a distance travelled in association with the lane change operation.

F. A system comprising: one or more processors; and one or more non-transitory computer-readable media storing instructions, that when executed by the one or more processors, cause the system to perform operations comprising: determining, as a constraint space, a first region in an environment of a vehicle through which the vehicle is unable to travel, wherein the first region is associated with a first time period; determining, as a configuration space and based at least in part on a capability of the vehicle, a second region of the environment associated with a second time period; determining, as a gap in the environment, a portion of the configuration space exclusive of the constraint space; determining, based at least in part on the gap, a trajectory for performing a lane change operation; determining a cost associated with the trajectory; and controlling the vehicle based at least in part on the trajectory and the cost.

G. The system as paragraph F recites, wherein the first region is based at least in part on an object proximate the vehicle, the operations further comprising: projecting object data associated with the object into a coordinate space, wherein a resulting projection comprises a representation of a predicted behavior of the object in the environment; and determining the gap based at least in part on the representation of the predicted behavior of the object in the coordinate space.

H. The system as paragraph G recites, wherein the object data comprises a position over time of the object relative to a route frame associated with the vehicle.

I. The system as any of paragraphs F-H recites, wherein determining the constraint space is based at least in part on at least one of a safety distance, a distance range to start a lane change operation, a time range to start a lane change operation, an acceleration range, a velocity range, a lane change time, a blinker time, a junction space, a lane ending, or a speed limit.

J. The system as any of paragraphs F-I recites, wherein determining the configuration space is based at least in part on one or more of a position of the vehicle, a maximum acceleration of the vehicle, a maximum deceleration of the vehicle, or a speed constraint for the vehicle.

K. The system as any of paragraphs F-J recites, wherein the vehicle is associated with a first lane and performing the lane change operation causes the vehicle to move into a second lane proximate the first lane, wherein the gap is a first gap associated with the first lane, wherein the operations further comprise determining a second gap associated with the second lane, and wherein the trajectory passes through the first gap and the second gap.

L. The system as any of paragraphs F-K recites, wherein the trajectory comprises a potential trajectory, the operations further comprising: determining, in a coordinate space, a first representation of a portion of the environment associated with a first lane; determining, in the coordinate space, a second representation of a portion of the environment associated with a second lane; and determining, in the coordinate space, a third representation of a portion of the environment associated with the first lane and the second lane, wherein determining the trajectory based at least in part on the gap comprises comparing the potential trajectory with the first representation, the second representation, and the third representation to determine whether the potential trajectory is associated with gaps in the first representation, the second representation, and the third representation.

M. The system as paragraph L recites, wherein the cost comprises a first cost, the operations further comprising: determining that the potential trajectory is associated with the gaps in the first representation, the second representation, and the third representation; determining that another potential trajectory is associated with the gaps in the first representation, the second representation, and the third representation; determining a second cost associated with the other potential trajectory; and determining that the first cost is less than the second cost.

N. The system as any of paragraphs F-M recites, wherein the cost is associated with at least one of a period of time the vehicle is associated with a current lane, a period of time associated with the lane change operation, or a distance travelled in association with the lane change operation.

O. One or more non-transitory computer-readable media storing instructions, that when executed by one or more processors, cause the one or more processors to perform operations comprising: determining, as a constraint space, a first region in an environment of a vehicle through which the vehicle is unable to travel, wherein the first region is associated with a first time period; determining, as a configuration space and based at least in part on a capability of the vehicle, a second region of the environment associated with a second time period; determining, as a gap in the environment, a portion of the configuration space exclusive of the constraint space; determining, based at least in part on the gap, a trajectory for performing a lane change operation; determining a cost associated with the trajectory; and controlling the vehicle based at least in part on the trajectory and the cost.

P. The one or more non-transitory computer-readable media as paragraph O recites, wherein the constraint space is associated with an object, and wherein determining the gap in the environment comprises: projecting object data associated with the object into a coordinate space, wherein the object data comprises a position over time of the object relative to a route frame associated with the vehicle, and wherein a resulting projection comprises a representation of a predicted behavior of the object in the environment; and determining the gap based at least in part on the representation of the predicted behavior of the object in the coordinate space.

Q. The one or more non-transitory computer-readable media as paragraph O or P recites, wherein determining the constraint space is based at least in part on at least one of a safety distance, a distance range to start a lane change operation, a time range to start a lane change operation, an acceleration range, a velocity range, a lane change time, a blinker time, a junction space, a lane ending, or a speed limit.

R. The one or more non-transitory computer-readable media as any of paragraphs O-Q recites, wherein determining the configuration space is based at least in part on one or more of a position of the vehicle, a maximum acceleration of the vehicle, a maximum deceleration of the vehicle, or a speed constraint for the vehicle.

S. The one or more non-transitory computer-readable media as any of paragraphs O-R recites, wherein the trajectory comprises a potential trajectory, the operations further comprising: determining, in a coordinate space, a first representation of a portion of the environment associated with a first lane; determining, in the coordinate space, a second representation of a portion of the environment associated with a second lane; and determining, in the coordinate space, a third representation of a portion of the environment associated with the first lane and the second lane, wherein determining the trajectory based at least in part on the gap comprises comparing the potential trajectory with the first representation, the second representation, and the third representation to determine whether the potential trajectory is associated with gaps in the first representation, the second representation, and the third representation.

T. The one or more non-transitory computer-readable media as paragraph S recites, wherein the cost comprises a first cost, the operations further comprising: determining that the potential trajectory is associated with the gaps in the first representation, the second representation, and the third representation; determining that another potential trajectory is associated with the gaps in the first representation, the second representation, and the third representation; determining a second cost associated with the other potential trajectory; and determining that the first cost is less than the second cost.

While the example clauses described above are described with respect to one particular implementation, it should be understood that, in the context of this document, the content of the example clauses can also be implemented via a method, device, system, a computer-readable medium, and/ or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
receiving sensor data from a sensor associated with a vehicle traversing an environment, the environment comprising a first lane associated with a current position of the vehicle and a second lane proximate the first lane;
determining, based at least in part on the sensor data, a presence of an object in the environment and a predicted behavior of the object;
defining, as a configuration space and based at least in part on a maximum acceleration and a maximum deceleration of the vehicle, a set of positions the vehicle can have over a period of time in the first lane and the second lane;
determining, based at least in part on the predicted behavior of the object and the configuration space, a first gap associated with a second period of time prior to a lane change operation and representing a first portion of the configuration space, a second gap associated with a third period of time during the lane change operation and representing a second portion of the configuration space, and a third gap associated with a fourth period of time after the lane change operation and representing a third portion of the configuration space, wherein the first gap, the second gap, and the third gap have a constant lateral width based at least in part on a representation of the vehicle;
determining, based at least in part on the first gap, the second gap, and the third gap, a trajectory for performing the lane change operation;
determining a cost associated with the trajectory; and
based at least in part on a determination that the cost is below a threshold, controlling the vehicle to perform the lane change operation based at least in part on the trajectory, wherein the trajectory passes through the first gap, the second gap, and the third gap.

2. The method as claim 1 recites, further comprising:
determining, based at least in part on the predicted behavior of the object, a distance parameter and a time parameter associated with the object, wherein the distance parameter is determined based at least in part on a position of the object relative to a route frame associated with the vehicle;
modeling, based at least in part on the distance parameter and the time parameter, a representation of the object into a coordinate space; and
determining at least one of the first gap or the second gap based at least in part on the representation of the object in the coordinate space.

3. The method as claim 2 recites, wherein the object is associated with the second lane, and
wherein determining the second gap comprises determining, based at least in part on the distance parameter and the time parameter, a portion of the configuration space that is independent of the object.

4. The method as claim 1 recites, further comprising determining whether the trajectory is valid based at least in part on one or more of the first gap or the second gap, wherein controlling the vehicle to perform the lane change operation based at least in part on the trajectory is further based at least in part on determining that the trajectory is valid.

5. The method as claim 1 recites, wherein the cost is associated with at least one of a period of time that the vehicle is associated with the first lane, a period of time associated with the lane change operation, or a distance travelled in association with the lane change operation.

6. A system comprising:
one or more processors; and
one or more non-transitory computer-readable media storing instructions, that when executed by the one or more processors, cause the system to perform operations comprising:
determining, as a constraint space, a first region in an environment of a vehicle through which the vehicle is unable to travel, wherein the first region is associated with a first time period;
determining, as a configuration space and based at least in part on a capability of the vehicle, a second region of the environment associated with a second time period;
determining, as a first gap in the environment, a first portion of the configuration space exclusive of the constraint space;
determining, as a second gap in the environment, a second portion of the configuration space exclusive of the constraint space;
determining, as a third gap in the environment, a third portion of the configuration space exclusive of the constraint space, wherein the first gap, the second gap, and the third gap have a constant lateral width based at least in part on a representation of the vehicle;
determining, based at least in part on the first gap, the second gap, and the third gap, a trajectory for performing a lane change operation;
determining a cost associated with the trajectory based at least in part on an amount of time spent in a lane prior to initiating the lane change operation; and
controlling the vehicle based at least in part on the trajectory and the cost.

7. The system as claim 6 recites, wherein the first region is based at least in part on an object proximate the vehicle, the operations further comprising:
projecting object data associated with the object into a coordinate space, wherein a resulting projection comprises a representation of a predicted behavior of the object in the environment; and determining the first gap based at least in part on the representation of the predicted behavior of the object in the coordinate space.

8. The system as claim 7 recites, wherein the object data comprises a position over time of the object relative to a route frame associated with the vehicle.

9. The system as claim 6 recites, wherein determining the constraint space is based at least in part on at least one of a safety distance, a distance range to start the lane change operation, a time range to start the lane change operation, an acceleration range, a velocity range, a lane change time, a blinker time, a junction space, a lane ending, or a speed limit.

10. The system as claim 6 recites, wherein determining the configuration space is based at least in part on one or more of a position of the vehicle, a maximum acceleration of the vehicle, a maximum deceleration of the vehicle, or a speed constraint for the vehicle.

11. The system as claim 6 recites,
wherein the vehicle is associated with a first lane and performing the lane change operation causes the vehicle to move into a second lane proximate the first lane, and
wherein the first gap is associated with the first lane and the second gap is associated with the second lane.

12. The system as claim 6 recites, wherein the trajectory comprises a potential trajectory, the operations further comprising:
determining, in a coordinate space, a first representation of a first portion of the environment associated with a first lane;
determining, in the coordinate space, a second representation of a second portion of the environment associated with a second lane; and
determining, in the coordinate space, a third representation of a third portion of the environment associated with the first lane and the second lane,
wherein determining the trajectory based at least in part on the first gap, the second gap, and the third gap comprises comparing the potential trajectory with the first representation, the second representation, and the third representation to determine whether the potential trajectory is associated with the first gap, the second gap, and the third gap in the first representation, the second representation, and the third representation, respectively.

13. The system as claim 12 recites, wherein the potential trajectory comprises a first potential trajectory and the cost comprises a first cost, the operations further comprising:
determining that the first potential trajectory is associated with the first gap, the second gap, and the third gap in the first representation, the second representation, and the third representation, respectively;
determining that a second potential trajectory is associated with the first gap, the second gap, and the third gap in the first representation, the second representation, and the third representation, respectively;
determining a second cost associated with the second potential trajectory; and
determining that the first cost is less than the second cost.

14. The system as claim 6 recites, wherein the cost is associated with at least one of a period of time associated with the lane change operation, or a distance travelled in association with the lane change operation.

15. One or more non-transitory computer-readable media storing instructions, that when executed by one or more processors, cause the one or more processors to perform operations comprising:
determining, as a constraint space, a first region in an environment of a vehicle through which the vehicle is unable to travel, wherein the first region is associated with a first time period;
determining, as a configuration space and based at least in part on a capability of the vehicle, a second region of the environment associated with a second time period;
determining, as a first gap in the environment, a first portion of the configuration space exclusive of the constraint space;
determining, as a second gap in the environment, a second portion of the configuration space exclusive of the constraint space;
determining, as a third gap in the environment, a third portion of the configuration space exclusive of the constraint space, wherein the first gap, the second gap, and the third gap have a constant lateral width based at least in part on a representation of the vehicle;
determining, based at least in part on the first gap, the second gap, and the third gap, a trajectory for performing a lane change operation;
determining a cost associated with the trajectory based at least in part on an amount of time spent in a lane prior to initiating the lane change operation; and
controlling the vehicle based at least in part on the trajectory and the cost.

16. The one or more non-transitory computer-readable media as claim 15 recites, wherein the constraint space is associated with an object, and wherein determining the first gap in the environment comprises:
projecting object data associated with the object into a coordinate space, wherein the object data comprises a position over time of the object relative to a route frame associated with the vehicle, and wherein a resulting projection comprises a representation of a predicted behavior of the object in the environment; and
determining the first gap based at least in part on the representation of the predicted behavior of the object in the coordinate space.

17. The one or more non-transitory computer-readable media as claim 15 recites, wherein determining the constraint space is based at least in part on at least one of a safety distance, a distance range to start the lane change operation, a time range to start the lane change operation, an acceleration range, a velocity range, a lane change time, a blinker time, a junction space, a lane ending, or a speed limit.

18. The one or more non-transitory computer-readable media as claim 15 recites, wherein determining the configuration space is based at least in part on one or more of a position of the vehicle, a maximum acceleration of the vehicle, a maximum deceleration of the vehicle, or a speed constraint for the vehicle.

19. The one or more non-transitory computer-readable media as claim 15 recites, wherein the trajectory comprises a potential trajectory, the operations further comprising:
determining, in a coordinate space, a first representation of a first portion of the environment associated with a first lane;
determining, in the coordinate space, a second representation of a second portion of the environment associated with a second lane; and determining, in the coordinate space, a third representation of a third portion of the environment associated with the first lane and the second lane, wherein determining the trajectory based at least in part on the first gap, the second gap, and the third gap comprises comparing the potential trajectory with the first representation, the second representation, and the third representation to determine whether the potential trajectory is associated with the first gap, the second gap, and the third gap in the first representation, the second representation, and the third representation, respectively.

20. The one or more non-transitory computer-readable media as claim 19 recites, wherein the potential trajectory comprises a first potential trajectory and the cost comprises a first cost, the operations further comprising:

determining that the first potential trajectory is associated with the first gap, the second gap, and the third gap in the first representation, the second representation, and the third representation, respectively;

determining that a second potential trajectory is associated with the first gap, the second gap, and the third gap in the first representation, the second representation, and the third representation, respectively;

determining a second cost associated with the second potential trajectory; and determining that the first cost is less than the second cost.

* * * * *